United States Patent [19]
Wilkinson, III et al.

[11] Patent Number: 6,014,659
[45] Date of Patent: *Jan. 11, 2000

[54] COMPRESSED PREFIX MATCHING DATABASE SEARCHING

[75] Inventors: Hugh M. Wilkinson, III, Newton; George Varghese, Bradford; Nigel T. Poole, Natick, all of Mass.

[73] Assignee: Cabletron Systems, Inc., Rochester, N.H.

[*] Notice: This patent is subject to a terminal disclaimer.

[21] Appl. No.: 08/473,135

[22] Filed: Jun. 7, 1995

Related U.S. Application Data

[62] Division of application No. 08/441,253, May 15, 1995, Pat. No. 5,781,772, which is a continuation of application No. 08/016,659, Feb. 10, 1993, abandoned, which is a continuation of application No. 07/378,718, Jul. 12, 1989, abandoned.

[51] Int. Cl.[7] .................................................. G06F 17/30
[52] U.S. Cl. .............................. 707/3; 370/351; 370/389; 370/392; 709/238
[58] Field of Search ..................................... 395/601–603, 395/612, 412, 413, 414, 415; 340/825.03, 826, 827, 825.07; 707/3, 5; 709/238; 370/351, 389, 392

[56] References Cited

U.S. PATENT DOCUMENTS

| | | | |
|---|---|---|---|
| 3,676,851 | 7/1972 | Eastman | 364/200 |
| 4,384,325 | 5/1983 | Slechth, Jr. et al. | 364/200 |
| 4,433,392 | 2/1984 | Beaven | 364/900 |
| 4,453,217 | 6/1984 | Boivie | 364/300 |
| 4,464,650 | 8/1984 | Eastman et al. | 340/347 |
| 4,464,718 | 8/1984 | Dixon et al. | 364/200 |

(List continued on next page.)

OTHER PUBLICATIONS

Ai–Suwaiyel and Horowitz, Algorithms for Trie Compaction, ACM Trans. Database System, 9(2):243–263, 1977.
Amer et al., A Survey of Hierarchical Routing Algorithms and a New Hierarchical Hybrid Adaptive Routing Algorithm for Large . . . Networks, Communications, IEEE Int. Conf., Jun. 12–15 1988, pp. 999–1003, 1988.
Comer and Sethi, The Complexity of Trie Index Construction, Jour. ACM, 24(3):428–440, 1977.
Comer, Heuristics for Trie Index Minimization, ACM Trans. Database System, 4(3):383–395, 1979.

(List continued on next page.)

*Primary Examiner*—Paul V. Kulik
*Attorney, Agent, or Firm*—Wolf, Greenfield & Sacks, P.C.

[57] ABSTRACT

Aspects of the invention include a method of conducting a reduced length search along a search path. A node which would otherwise occur between a previous and a following node in the search path is eliminated, and information is stored as to whether, had said eliminated node been present, the search would have proceeded to the following node. During the search, a search argument is compared with the stored information, and the search effectively progresses from the previous node directly to the following node if the comparison is positive. In preferred embodiments, some nodes provide result values for the search, and a node is eliminated only if its presence would not affect the result value for the search. In another aspect, the invention features a method of conducting a two mode search of reduced length. For a first mode of the search, nodes along a search path are provided, at least some of the nodes including one or more pointers pointing to other nodes. A search argument comprising a series of search segments is provided, some values of segments of the argument corresponding to nodes along the search path, some other values of the segments relating to a second mode of the search. Indicators associated with nodes are provided, each indicator indicating the segments corresponding to the second mode. The search path is searched by processing successive search segments by inspecting the indicator associated with each node, and proceeding to the second search mode if the indicator indicates that the segment relates to the second mode.

18 Claims, 11 Drawing Sheets

U.S. PATENT DOCUMENTS

| | | | |
|---|---|---|---|
| 4,468,728 | 8/1984 | Wang | 364/200 |
| 4,606,002 | 8/1986 | Waisman et al. | 364/200 |
| 4,621,362 | 11/1986 | Sy | 370/88 |
| 4,644,496 | 2/1987 | Andrews | 395/800 |
| 4,677,550 | 6/1987 | Ferguson | 395/600 |
| 4,706,081 | 11/1987 | Hart et al. | 340/825.03 |
| 4,811,337 | 3/1989 | Hart | 370/85 |
| 4,823,111 | 4/1989 | Tsuchiya et al. | 340/825.05 |
| 4,882,699 | 11/1989 | Evensen | 379/284 |
| 4,906,991 | 3/1990 | Fiala et al. | 341/51 |
| 4,914,571 | 4/1990 | Baratz et al. | 364/200 |
| 5,001,755 | 3/1991 | Skret | 380/46 |
| 5,008,882 | 4/1991 | Peterson et al. | 370/94.3 |
| 5,079,767 | 1/1992 | Perlman | 370/94.3 |
| 5,202,986 | 4/1993 | Nickel | 395/600 |
| 5,497,485 | 3/1996 | Ferguson et al. | 395/600 |
| 5,519,858 | 5/1996 | Walton et al. | 395/600 |
| 5,721,899 | 2/1998 | Namba | 707/3 |
| 5,781,772 | 7/1998 | Wilkinson, III et al. | 707/3 |

OTHER PUBLICATIONS

Fredkin, Trie Memory, Comm. ACM 3(9):490–499, 1960.

Garcia–Luna–Aceves, Routing Management in Very Large–Scale Networks, Future Generations Computer Systems 4:81–93, 1988.

Knuth, "Patricia" Algorithm from Sorting and Searching, The Art of Computer Programming III, Addison–Wesley Publishing Co., Reading, MA, 1970, pp. 490–493.

Ramesh et al., Variable–Depth Trie Index Optimization: Theory and Experimental Results, ACM Transactions on Database Systems 14:41–74, 1989.

Seifert, Bridges and Routers, IEEE Network Magazine, 2(1):57–64, 1988.

Wolstenholme, Filtering of Network Addresses in Real Time by Sequential Decoding, IEEE Proceedings 135:55–59, 1988.

FIG. 2B PRIOR ART

| IDI Format Binary DSP | AFI value | IDP Length Decimal Digits | IDP Length Octets | Maximum DSP Length Octets | Maximum NSAP Length Octets |
|---|---|---|---|---|---|
| X. | 37.53 | 16 | 8 | 9 | 17 |
| ISO DCC | 39 | 5 | 3 | 14 | 17 |
| F.69 | 41.55 | 10 | 5 | 12 | 17 |
| E.163 | 43.57 | 14 | 7 | 10 | 17 |
| E.164 | 45.59 | 17 | 9 | 9 | 18 |
| ISO 6523-ICD | 47 | 6 | 3 | 13 | 16 |
| Local | 49 | 2 | 1 | 15 | 16 |

FIG. 2C PRIOR ART

| IDI Format Binary DSP | AFI value Decimal | IDP Length Decimal Digits | Maximum DSP Length Decimal Digits | Maximum NSAP Length Decimal Digits | Maximum NSAP Length Octets |
|---|---|---|---|---|---|
| X. | 36.52 | 16 | 24 | 40 | 20 |
| ISO DCC | 38 | 5 | 35 | 40 | 20 |
| F.69 | 40.54 | 10 | 30 | 40 | 20 |
| E.163 | 42.56 | 14 | 26 | 40 | 20 |
| E.164 | 44.58 | 17 | 23 | 40 | 20 |
| ISO 6523-ICD | 46 | 6 | 34 | 40 | 20 |
| Local | 48 | 2 | 38 | 40 | 20 |

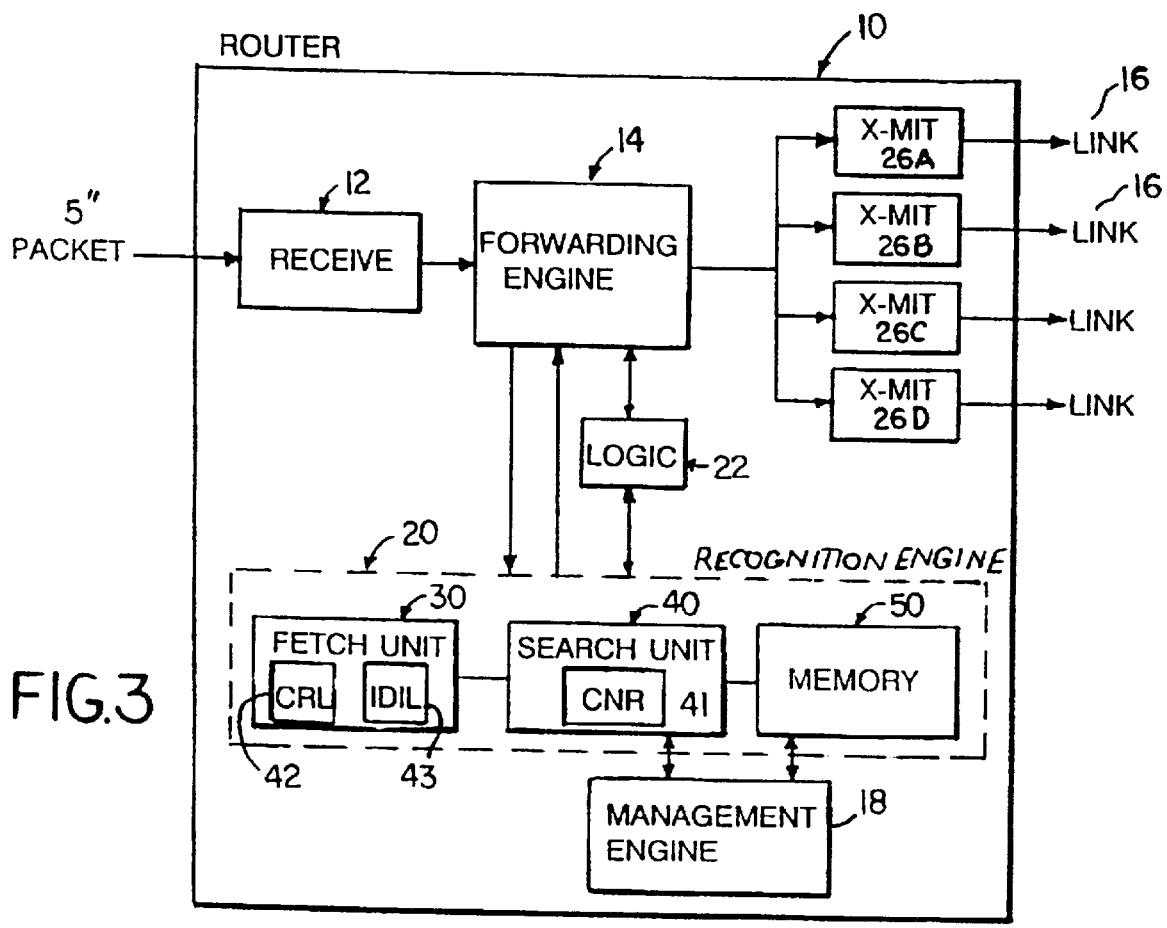

FIG.9

| Offset from Node | Contains |
|---|---|
| 00-01 | Node control work (16 bits) (Fast Static RAM). |
| 02-0f | Nothing * |
| 10-1f | String storage space; 16 semi-octets, one semi-octet per octet of storage (String DRAM). (Nodes 1000-7fff and 9000-ffff only). |
| 20-3f | Additional string storage space; 32 more semi-octets, one per octet of storage (String DRAM). (Nodes 7800-7fff and f800-ffff only). |
| 40-5f | Sixteen "next node" pointers (Node Pointer DRAM). (Nodes 8000 - ffff only). ** |
| 60-61 | DSP-transition pointer (DSP Pointer SRAM). (Nodes 8000 - ffff only). |
| 62-63 | Level-1 transition pointer (same physical pointer is accessible at nodes 8000 - ffff only ). |
| 64-7f | Nothing * |
| 80-9f | Storage space for key to be searched and result of search (eight contexts supported, one each at nodes 8000 through 8007 only). |
| a0-bf | Alias address of above (see note below). |
| c0-ff | Control and status registers (nodes 0 through 7 can bes used to access one register set). |

NOTE: Resources at addresses 00 -7f can only be accessed when the ARE is in maintenance mode.

\* "Nothing" indicates that read data is undefined, write data is ignored. Fields defined for only some "N" nodes also store "Nothing in the remaining nodes.

\*\* The "next node" pointers are those that will be accessed (during a search) according to the current digit. A digit of "0" will access the pointer at address offset 40; a digit of "1" will access the pointer at address offset 42; etc.

COMPRESSED PREFIX MATCHING DATABASE SEARCHING

This is a divisional application of application Ser. No. 08/441,253, filed May 15, 1995, now U.S. Pat. No. 5,781,772, which was a continuation of application Ser. No. 08/016,659, filed Feb. 10, 1993 now abandoned, which was a continuation of application Ser. No. 07/378,718, filed Jul. 12, 1989 now abandoned.

BACKGROUND OF THE INVENTION

This invention relates to prefix matching in database searches.

A database associates sets of strings, or keys, with stored information. Databases are frequently used to search for particular information associated with a given input string or key.

Some applications also require the retrieved information be associated with the best matching prefix, if any, of the input string. For example, if the string "CART" is the input string to a database, and the database holds information associated with the strings "C", "CA", and "CARL", the best matching prefix to "CART" is the string "CA", and the information associated with "CA" should be returned. Note that "C" is also a prefix of "CART", but "CA" is a better (i.e. longer) prefix than "C".

Best matching prefix searching is typically performed by a database having a hierarchical, tree-like structure. This type of database is often called a trie. A trie database allows both exact matching (i.e. searching for a string that is exactly equal to the input string) as well as best prefix matching.

Referring to FIG. 1, a trie consists of a number of nodes 32 each of which contain pointers to other nodes. Each node has an array of n pointers, one pointer corresponding to each of n possible characters that can occur in a character of the input string. The trie also has a single node 33 called the root, at which the search begins.

To look up a string, e.g. "CAD", a search starts at the root node of the trie and uses the first character "C" to index into the array of pointers at the root node. The "C" pointer 34 will point to a section of the trie that contains information for all strings that begin with "C". The search travels to this new node, and uses the next character in the input string, "A", to index into the array of stored pointers. The "A" pointer 35 yields the root of another section of the trie that contains information for all strings that of all strings that begin with "CA". Finally, the search uses the last character "D" to index into the array to obtain the actual entry corresponding to "CAD".

The storage requirement of a trie can be calculated, and is roughly proportional to the product of: (1) the number of entries in the database, (2) the number of distinct characters, (3) the average number of characters in a word, and (4) the storage size of a pointer. Thus for a 50,000 entry directory database having (2) 26 possible characters, (3) up to 20 characters per entry, and (4) 4 byte pointers, the amount of storage required is around 2K bytes per entry, or 100 Mbytes.

Despite this storage requirement, the trie is attractive for fast look up and prefix matching. Some useful applications include directory look ups in a telephone context, on-line dictionaries, spelling checkers, and looking up social security numbers.

A computer network consists of a number of computers that are connected together by devices called routers, such that any computer can send messages, called packets, to any other computer. By analogy, the routers are post offices, and the packets correspond to letters. Each packet carries a destination address, and each router computes the best path towards that destination address. Each router along this path is responsible for "forwarding" the packet to the next router on the path. This forwarding process continues until the packet reaches its destination. When a packet arrives at a router, the router searches for the destination address in a forwarding database. The forwarding database consists of a list of destination addresses and the next router in the path toward each such address.

Since the postal system is too large, it is impossible for each post office to store a database containing entries for every address in the world. Instead, to route a letter to WHITEHALL-LONDON-ENGLAND, it is first sent to the destination country (England), then to the city (London) and finally to the street address (Whitehall) in the destination city. Thus we could describe the postal system addresses as having three levels of hierarchy: Level 0 is the street address, Level 1 is the city, and Level 2 the country. For the same reason, destination addresses in very large computer networks are also divided hierarchically and have several levels of hierarchy.

One method for constructing very large networks that is described by the Internation Standards Organization (ISO) Routing Standard. This is soon to be a worldwide standard which will be used to build large global networks. According to the ISO standard, each router does not store routing information for every possible address in the network. Rather, it stores routing information for partial addresses.

For example, a router might store the best ways to forward a packet to the partial addresses DEC-READING-ENGLAND, ENGLAND, and LONDON-ENGLAND. Suppose the router now gets a packet addressed to WHITEHALL-LONDON-ENGLAND. The ISO Standard states that the router should send the packet to the best matching partial address it has in its database. Thus, in the above example, since the router knows how to forward packets to LONDON-ENGLAND, the packet should be sent there. In this scheme, each time a packet is forwarded it gets closer to its destination.

The ISO Routing Standard for worldwide networks specifies that each router in the network maintain a database of partial addresses. When a packet arrives at the router, the router must search through the database and retrieve the entry corresponding to the destination address in the packet or, failing that, retrieve the entry corresponding to the best matching prefix of the destination address.

A ISO routing standard of particular interest is the open Systems Interconnection (OSI) standards, such as ISO 8348 Addendum 2 (ISO 8348/AD2), as promulgated by the International Organization for Standardization. Under this standard, the administration of sub-spaces of an OSI address has been delegated to various internationally recognized organizations. Each of these organizations has been allocated a unique initial address octet (typically eight bits) indicating the delegated administration. The individual organizations are responsible for allocating further portions of the address, as identified by unique initial parts of a length specific to the organization, for administration and allocation by other organizations. This process can iterate many times, but guarantees that specific assigned node addresses are globally unique.

An OSI network address (NSAP) format is shown in FIG. 2A. It includes an initial domain part IDP 60 and a domain specific part DSP 70. The format and length of the IDP 60 is standardized. It consists of two parts, the AFI 62 (authority and format identifier) and the IDI 64 (initial domain identifier). These elements each require a specified number of bits, counted by octets (eight bits) or semi-octets (four bits). The digits in the AFI and IDI are binary coded decimal digits. Each decimal digit is represented by a semi-octet value in the range of 0000 (decimal 0) to 1001 (decimal 9).

The AFI 62 is standardized as two semi-octets (i.e. two binary coded decimal digits) long and is used to specify the authority responsible for allocating IDI values, and for defining the format of the IDI. The IDI 64 identifies the subdomain from which DSP values are allocated, and the authority responsible for allocating the values. Depending upon the IDI format, the actual number of digits in the IDI field 64 may be fewer than the number of semi-octets which are allocated to the IDI field. The Preferred Binary Encoding specified by ISO 8348/AD2 specifies that the IDI be padded with leading digits, if necessary, to obtain the maximum IDP length specified by the AFI. Thus the IDI field may contain some digits 66 which convey address information, and other fill digits 65 which do not convey information. The useful IDI digits 66 are right-justified in the IDI field, and the remainder of the IDI field contains the fill digits 65. The value of the AFI be used to determine the IDP length and to locate the useful IDI digits 66, as will be fully discussed below.

IDI formats specified in the ISO 8348/AD2 standard include those promulgated by a number of different authorities, including the following:

X.121 (Public data network numbering)
ISO DCC (Geographic address assignment under ISO control)
F.69 (Telex numbering)
E.163 (Telephone numbering)
E.164 (ISDN numbering)
ISO ICD (Non-geographic address assignment under ISO control)
Local (IDI is null; address is not necessarily unique).

The IDI 64 identifies the authority which administers the DSP. The specific format of the DSP 70, except for its maximum length, is not presently prescribed by ISO but rather is left to the indicated authority. The DSP may use a binary coded decimal syntax similar to the IDP, or may use a straight binary syntax. Where the DSP uses a binary syntax, the DSP value is represented directly as binary octets. Where the DSP uses a decimal syntax, each decimal digit is represented by a semi-octet in the range of 0000 to 1001 (as in the IDP). In the latter case, where necessary, the semi-octet value of 1111 is used as a pad after the last semi-octet of the DSP to round the entire address length to an integral number of octets.

FIGS. 2B and 2C are tables indicating the AFI values and maximum lengths required for IDP, DSP and entire NSAP address corresponding to each IDI format. (Note that in NSAP addresses in ISO 8348/AD2 format, the IDI is padded to the maximum length.) Where two values are given for the AFI, the first identifies an IDI which is padded to maximum length with zero (0000) leading digits, while the second identifies an IDI which is padded with non-zero leading digits (the non-zero padding digits must have the value 0001). Non-zero leading digits are used to alleviate confusion when the first digit of the actual IDI value is equal to 0000. Therefore, if non-zero padding digits are used in the IDI, the first zero digit in the IDI must be the first non-fill digit. FIG. 2B applies to cases where the DSP syntax is binary, whereas FIG. 2C applies to cases where it is decimal.

As an example, a two semi-octet BCD AFI value of thirty-six indicates that: (1) the destination system is using an X.121 public network address, (2) the IDI 64 consists of up to fourteen significant decimal digits identifying a subdomain authority, and (3) the DSP 70 semi-octets, if present, will represent a destination device in Binary Coded Decimal syntax.

In the current version of the DECnet Phase V addresses for the Digital Network Architecture (DNA), as promulgated by Digital Equipment Corporation, Maynard, Mass., for example, the DSP 70 has binary syntax, and the last nine octets of the NSAP (the last seven of which must be in the DSP) are partitioned into several fields as shown in FIG. 2A. (Those fields in FIG. 2A which are specific to DNA are marked with an asterisk (*))

LOC-AREA 72 is a field defined for backward compatibility with former versions of DNA and for possible future enhancements. The LOC-AREA 72 is defined as the first two octets of the last nine octets of the NSAP.

Level-1 ID 74 is a six octet field which uniquely identifies the destination system within a DECnet area. Correct operation of the DNA Network Routing Layer requires only that the ID 74 field be unique within a DECnet area (except for Level-2 routers, where the Level-1 ID of the Level-2 router is typically unique within the whole private network). However, the ID field is usually chosen from the IEEE 802 address space, in which case it is guaranteed to be globally unique. If an 802 address is used, it may correspond to the actual Data Link address of the node on an 802 LAN, but this correspondence is not assumed or required by the routing algorithms.

SEL 76 is a one octet field at the end of a DECNET Phase V address. SEL acts as a selector for the module which is to receive the packet once it reaches its destination. The concatenation of the IDP 60 and the leading portion of the DSP (i.e., if it exists, the portion of the DSP preceding the last nine octets) is called the PRE-LOC-AREA 80. The concatenation of the PRE-LOC-AREA and LOC-AREA is known as the Area Address 90. (Thus the Area Address is all but the last seven bytes of the NSAP). If a packet has an Area Address 90 which exactly matches that of the local area, then the packet's destination is local to the area and is routed by Level-1 routing, using the Level-1 ID field 74. Otherwise, it is routed by Level-2 routing. Level-2 routing acts on prefix portions of the area address, directing the packet to that area whose area address has the maximum exact match with the packet address.

Other, non-DNA nodes need not follow DNA addressing conventions or requirements. However, routers designed for DNA address syntax will interoperate with non-DNA nodes and non-DNA networks if certain requirements are met. There are several possible modes of interoperation:

In one mode, a non-DNA End System is operating in the DNA Level-2 network, and an adjacent Level-2 router is manually configured to forward packets to the End System via a DNA "Reachable Address Entry". The only requirement of the address of the non-DNA End System is that every prefix of the End System's address, formed by removing at most 14 trailing semi-octets, must be distinct from all Area Addresses in the Level-2 network.

As an End System in a particular DNA area, the address of the non-DNA node is subject to the restriction that the leading octets, prior to the last 7 octets, must be equal to the Area Address of the area in which the node resides. Additionally, the leading 6 octets of the last seven octets must constitute a unique Level-1 ID within the area. Configuration of the adjacent router occurs manually, or, automatically via the ES/IS (ISO 9542) protocol.

Finally, a DNA network will interoperate with autonomous networks of non-DNA nodes via Reachable Addresses, using address prefixes.

Routing in a network is based on a forwarding database. In a forwarding database, each listed destination address is cross-referenced with the next link, and the address on that link, of the routing path a packet should take to reach its destination.

The database may be divided into two parts: (i) a part which maps network addresses onto internal indices, and (ii) a part which maps the internal indices onto sets of links and link address elements.

A network router obtains the destination address information from the header of a received packet, accesses the database to determine the best next link through which to route the packet and the data Link address on that link, and forwards the packet accordingly.

Known database formats affect the rate at which packets are forwarded, and the storage requirements of the database may be large.

SUMMARY OF THE INVENTION

According to the invention, a routing database requires less space than prior art databases for identical function. In addition, routing information is located more quickly using less expensive computing hardware.

One aspect of the invention is a method of conducting a search along a search path of reduced length. A node which would otherwise occur between a previous and a following node in the search path is eliminated, and information is stored as to whether, had said eliminated node been present, the search would have proceeded to the following node. During the search, a search argument is compared with the stored information, and the search effectively progresses from the previous node directly to the following node if the comparison is positive.

Preferred embodiments include the following features. Some nodes provide result values for the search. A node is eliminated only if its presence would not affect the result value for the search. The information to be compared is stored in the following node. The search has first and second modes, the first mode including processing nodes along the search path. The eliminated node is one that, if present, would either cause the search to progress to the following node, or cause the search to enter the second mode. The search argument comprises a series of search segments, some values of segments of said argument corresponding to nodes along the search path, some other values of the segments relating to the second mode of the search. The stored information is a sequence of said search segments. Indicators are associated with nodes, each indicator indicating the segments corresponding to the second mode. The search path is searched by processing successive search segments, the processing including inspecting the indicator associated with each node, and proceeding to the second search mode if the indicator indicates that the segment relates to the second mode. The second mode of the search comprises terminating said search. The search argument comprises a system address in a network.

Another aspect of the invention is a method of conducting a two mode search of reduced length. For a first mode of the search, nodes along a search path are provided, at least some of the nodes including one or more pointers pointing to other nodes. A search argument comprising a series of search segments is provided, some values of segments of the argument corresponding to nodes along the search path, some other values of the segments relating to a second mode of the search. Indicators associated with nodes are provided, each indicator indicating the segments corresponding to the second mode. The search path is searched by processing successive search segments by inspecting the indicator associated with each node, and proceeding to the second search mode if the indicator indicates that the segment relates to the second mode.

Preferred embodiments include the following features. If the indicator does not indicate that said segment corresponds to the second search mode, the indicators and the segment are examined to determine one pointer, and the search is continued to a subsequent node. Each indicator is a bit in a sequence of bits associated respectively with a plurality of the segment values. The second mode of the search comprises terminating the search. The search argument comprises a system address in a network.

Another aspect of the invention is a method of hierarchically searching a search path. A hierarchy of nodes along the search path is provided, at least some of the nodes including one or more pointers indicating other nodes at different hierarchical levels. A search argument comprising a series of search segments is provided, successive segments of the argument corresponding to successive nodes along the search path. The path is searched by processing successive search segments in the nodes, including inspecting the pointers, and proceeding to the indicated nodes if the search argument satisfies a validation condition.

Preferred embodiments include the following features. The validation condition comprises counting the number of processed or unprocessed segments. The search arguments are system addresses for a computer network in accordance with ISO 8348/AD2. The search comprises a Level-2 routing search at a first hierarchical level and a Level-1 routing search at a second hierarchical level. The search comprises a IDP search at a first hierarchical level and a DSP search at a second hierarchical level.

Another aspect of the invention is a method of parsing a search argument of segments, some segments having predetermined values. Nodes along a search path are provided, at least some of the nodes including one or more pointers indicating subsequent nodes, each pointer corresponding to one possible value of a segment. The pointers corresponding to the predetermined segment values are directed to indicate the node storing the pointer as the subsequent node.

Preferred embodiments include the following features. The search argument is a network address in accordance with ISO 8348/AD2, and the predetermined values are the values of fill digits.

Another aspect of the invention is an apparatus for storing a trie shaped routing database for computer network routing, nodes of the trie storing data of various types. The apparatus includes a plurality of memory devices having differing access times and power requirements, each device storing data of a particular type for more than one node. The memory devices are chosen in order to store data types requiring rapid access in memory devices with low access times, and otherwise store data types requiring less rapid access in memory devices with low power consumption.

The invention saves storage space, processing time, and hardware.

Other advantages and features will become apparent from the following description of the preferred embodiment and from the claims.

DESCRIPTION OF THE PREFERRED EMBODIMENT

We first briefly describe the drawings.

FIGS. 2B and 2C are tables of IDI formats.

FIG. 3 is a block diagram of a router having a recognition engine.

FIG. 9 is a table illustrating the locations of node data in the memories of FIG. 8.

STRUCTURE AND OPERATION

Figure 1:
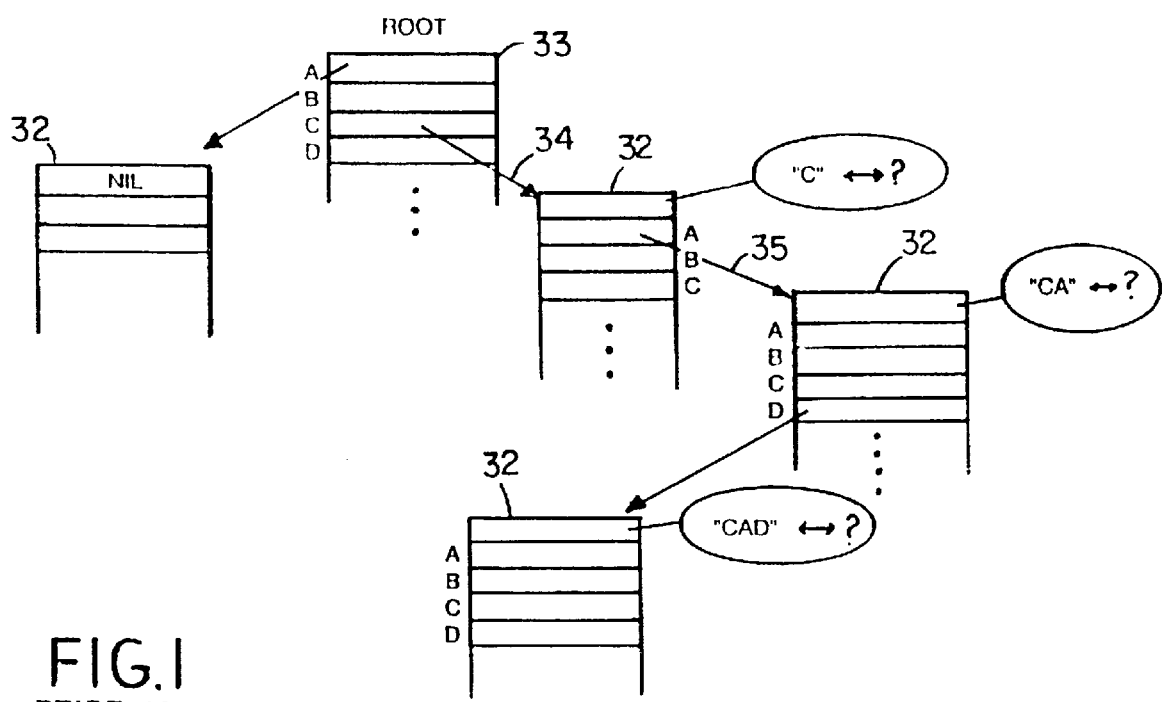
FIG. 1 is a diagram of a trie database.

Tries are an appropriate candidate for maintaining the a database of partial addresses in ISO routers. Tries support a best matching prefix search of a destination address easily. In addition, tries are appropriate for searching large and variable length strings such as ISO partial addresses. However, the storage requirements of tries can make the use of tries in practical routers infeasible. Also, to apply a trie to ISO addresses, the trie search method must be adapted to the particular characteristics of ISO addresses, such as the variable-length fields and fill digits discussed above.

The invention reduces the storage requirements of a trie database, and also adapts a trie search to ISO addresses. The storage reductions accomplished by the invention are detailed later in the disclosure.

The methods for reducing trie storage requirements are applicable to tries in a wide variety of contexts outside of the preferred embodiment; the methods for adapting trie searches to ISO addresses can also be useful in other contexts.

Referring to FIG. 3, in the primary operation of a router 10 a packet 11 is received at a receive unit 12. Receive unit 12 presents the packet to a forwarding engine 14. The forwarding engine 14 processes the packet header, extracting the destination network address and transferring it to a recognition engine 20. A logic unit 22 provides the logic signals used by forwarding engine 14 to interface with recognition engine 20. Recognition engine 20 uses the destination address to recover an index from a database stored in memory 50. This index is returned to the forwarding engine 14, which uses the value to access a forwarding database (not shown). The forwarding database consists of sets of link references and link addresses. Forwarding engine 14 then uses the link reference to direct packet 11 to one of several transmit units 26A through 26D (four being shown for illustrative purposes). Transmit units 26A through 26D are responsible for queuing packets and sending them via the network communications links 16 to other routers or destination systems.

In address recognition engine 20, a fetch unit 30 receives the packet destination address from forwarding engine 14 and presents the address, or specific fragments of the address, to a search unit 40. Search unit 40 uses the address or address fragments presented by fetch unit 30 to directly access memory 50. Intermediate results fetched from memory 50 are processed by search unit 40 and are used, in conjunction with the address presented by fetch unit 30, to access further intermediate results and ultimately the final result. The final result is returned by search unit 40 to forwarding engine 14 which uses the result as an index into the forwarding database (not shown).

In other modes of operation, the database may be used by a management engine 18. Management engine 18 as detailed later in the disclosure is responsible for creating and maintaining the database stored in memory 50. Management engine 18 receives information about the current network connectivity on a continuous basis, through paths which are not shown. Management engine 18 presents address fragments, generated from network connectivity information, to search unit 40. The result of this search is returned to management engine 18, which uses the result to learn about the current information in the database. If it is necessary to update the database, so that it correctly represents the current network connectivity, management engine 18 directly accesses memory 50 to effect the changes.

As mentioned in the background to the invention, router 10 must be capable of performing Level-1 and Level-2 routing. Level-1 routing requires that an exact match of the network destination address presented by fetch unit 30 be located in the database. There are many known database structures that allow an exact match to be realized. Level-2 routing, however, requires that if an exact match cannot be found, then the entry in the database which is the longest prefix of the network destination address should be located. This requirement limits the number of different database structures that may be used.

Figure 4:
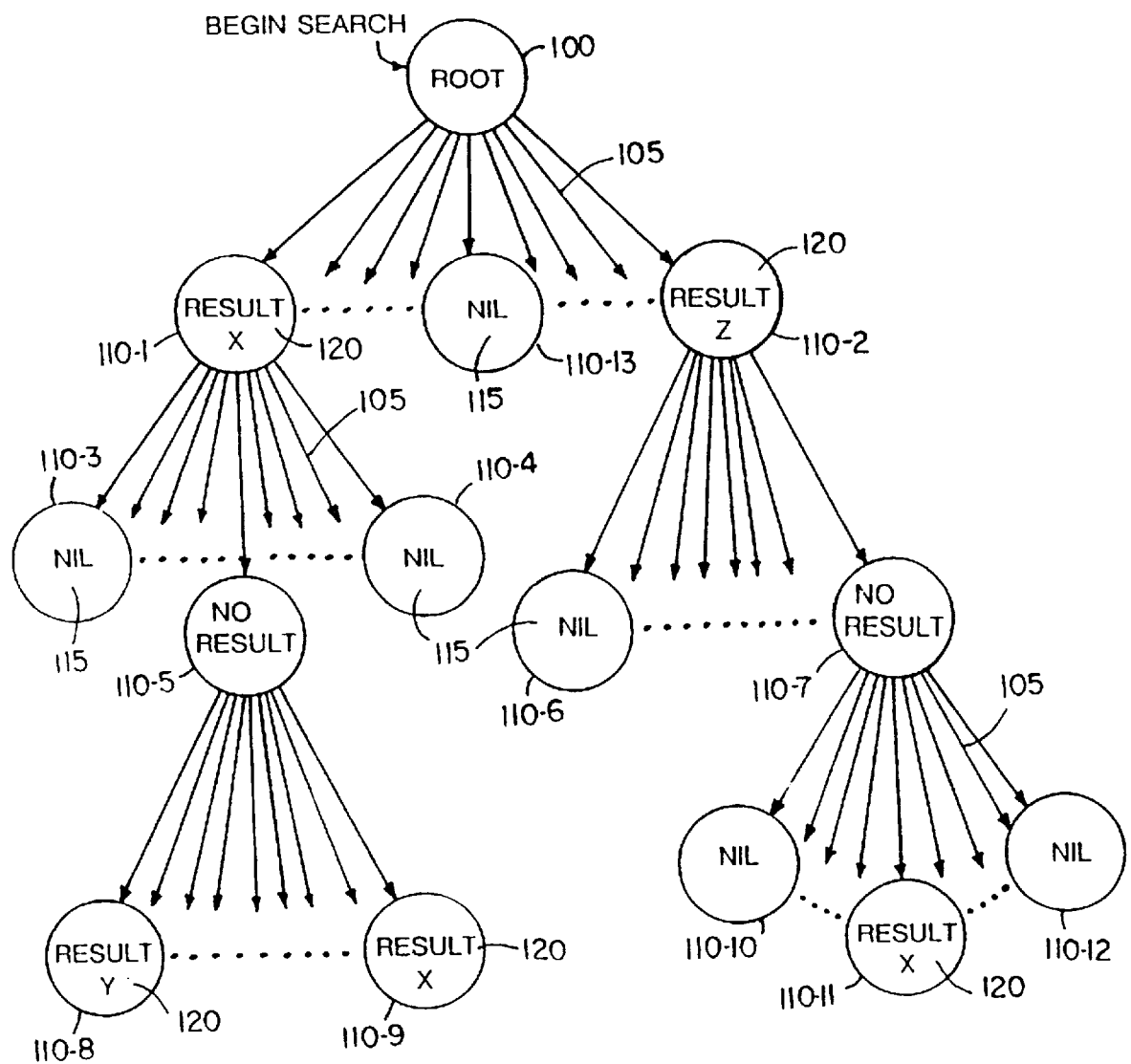
FIG. 4 is a diagram of an uncompressed routing database structure.

In the invention, the database stored in memory 50 is a particular type of tree structure known as a TRIE. FIG. 4 is an example of a fragment of such a TRIE structured database. Each node 110 of the TRIE may contain an array of sixteen pointers 105 to other nodes 110. A transition from the root of the TRIE to other nodes 110 is made by fragmenting the search argument (e.g a network destination address) into a sequence of segments (e.g. semi-octets); at each node in the TRIE, the next semi-octet in the sequence, having a value from zero through fifteen, is used to select one of the sixteen pointers.

Referring to FIG. 3, the Current Node Register 41 points in turn to the nodes of the TRIE that are traversed during a search. When a search is initiated, the Current Node Register 41 is set to point at the root of the TRIE. In the fragmentation of the search argument into semi-octets, the semi-octets formed correspond to the constituent digits of the NSAP discussed earlier.

Referring to FIG. 4, nodes 110 with pointers are called parent nodes; the targets of the pointers are child nodes. Nodes in the trie which do not contain pointers to other nodes (e.g nodes 110-8, 110-9 and 110-11) are called "terminal nodes". When the search reaches a terminal node, the search terminates. The search will also terminate if the pointer 105 selected by the next semi-octet points to a NIL node 115. (Although several nodes of FIG. 3 contain nil result values, for clarity, many other nil nodes have been omitted.)

If a terminal node is reached by using all of the semi-octets in the search argument, then an exact match has been located in the database, and the terminal node holds a result value 120 which corresponds to the search argument. If, however, a NIL node 115 is reached, or a terminal node (e.g 110-8) is reached before all of the sequence of semi-octets has been used, then an exact match of the search object is not contained in the database.

It is possible that a prefix of the search object is contained in the database; if this is the case, then at least one of the nodes traversed during the search will hold a result value 120. If no traversed node contains a result value (e.g. a search ending at node 110-13) then no such prefix exists in the database. If multiple nodes holding a result value are traversed, then multiple prefixes of the search object are contained in the database: the first such node traversed holds a result corresponding to the shortest prefix, while the last such node traversed holds a result corresponding to the longest prefix. The result corresponding to the longest prefix is returned as the result of the search.

In many cases, the result value 120 for a child node and its parent node would be identical. In these cases (e.g., nodes 110-5 and 110-7), the child node does not hold a result value 120. If the search terminates at a child node which does not contain a result value 120, the result value 120 of the most-recently-traversed prior node which has a result value is returned. In this way, a prefix stored in the database has its corresponding result value entered at only one node, simplifying maintenance.

The preceding outlines how a TRIE structured database can be used to enable a search process to locate an exact match or the best-prefix match of a given search argument. Two forms of database compression are used in preferred embodiments of the invention to reduce the amount of memory required to support the TRIE structure. These are known as pointer compression and path compression.

Figure 5:
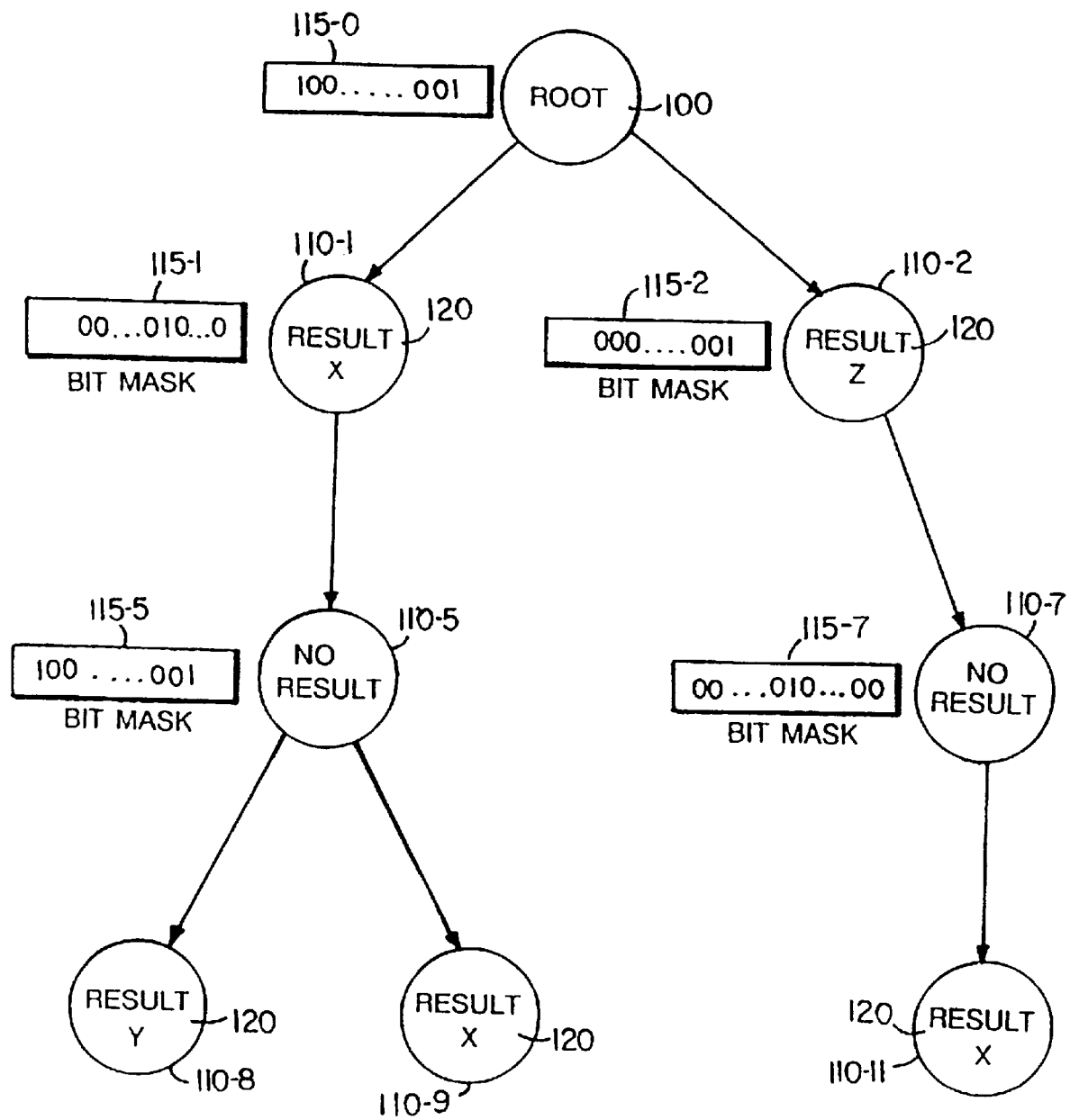
FIG. 5 is a diagram of a pointer-compressed routing database structure.

Referring to FIG. 5, pointer compression is achieved by eliminating all of the nil nodes and all of the pointers to nil nodes from the trie. This is done by associating a pointer bit mask 115 with each parent node in the trie. The bit mask indicates which of the child nodes are nil, i.e. which of the pointers 105 point to nil nodes. Each bit in the mask corresponds to one of the parent node's pointers, and is set if that pointer's target node is non-nil; otherwise it is cleared.

For example, the root node 100 is associated with bit mask 115-0. Two non-nil child nodes 110-1, 110-2 exist below the root node 100. Thus, the root node bit mask 115-0 contains two "1" bits, one for each of the non-nil child nodes. All other bits of the mask are "0", indicating that all other child nodes of the root node are nil nodes.

By comparing FIG. 5 to FIG. 4 it can be seen that the location of these two "1" bits correspond exactly to the location of the two pointers. In operation, before moving to a child node, the search unit 40 checks the parent bit mask 115 to determine that the new node is non-nil. If the new node is nil, then the search immediately terminates without moving to the new node.

Figure 5A:
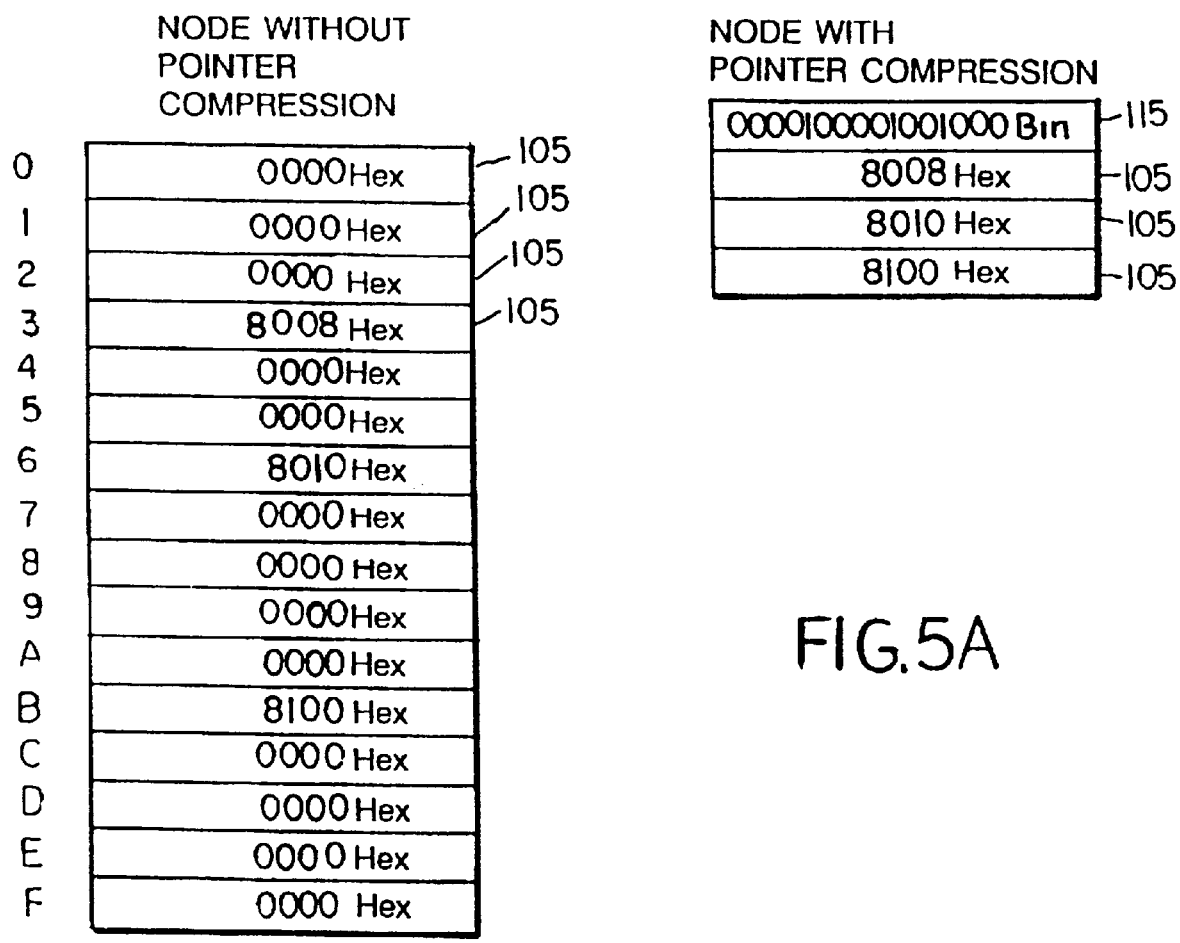
FIG. 5A is a diagram of a pointer-compressed node structure.

Thus, referring to FIG. 5A all nil nodes (and the pointers which indicate nil nodes) are eliminated from the trie, saving storage space. Since it would be necessary to store only one nil node for the entire TRIE, the memory savings are a result of the elimination of the pointers to the nil node or nodes. With pointer compression, the memory requirements for a TRIE structured database may be reduced, but the calculation of current node addresses is more complex. To determine the address of new nodes, the search unit 40 must reference the parent's bit mask 115 to determine the number and distribution of pointers 105. If the bit mask indicates that the pointer corresponding to the next semi-octet in sequence is; present, the bit mask is used to determine the location of the required pointer 115 in the list of pointers stored in the parent node.

To introduce path compression, we first note that pointer compression has eliminated nil nodes and pointers to nil nodes, but has not reduced the path length (i.e. the number of nodes) from the root node to any given result node. Path compression is used to achieve such reductions.

Figure 6:
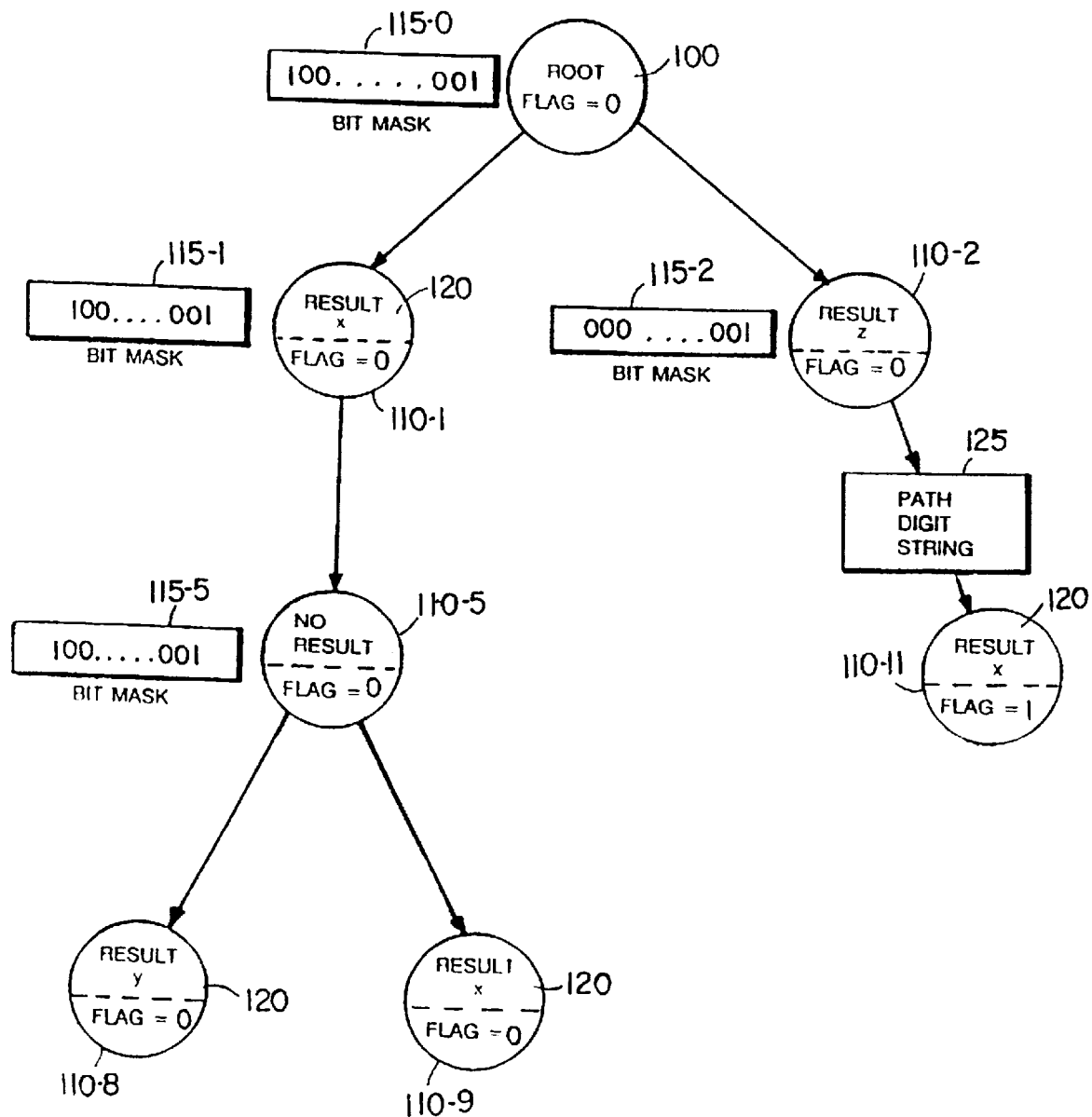
FIG. 6 is ia diagram of a path-compressed routing database structure.

Path compression eliminates each node in the database that has: (1) only one child node, and (2) no result value or the same result value as its parent node. Node 110-7 of FIG. 5 meets these requirements. Referring to FIG. 6, after path compression, node 110-7 has been eliminated, and node 110-11 is directly below node 110-2.

In the preferred embodiment of the invention, the semi-octets corresponding to the (one or more) eliminated nodes is stored as a path-compression digit string 125. (In FIG. 6, the string is just one digit in length.) In operation, search unit 40 compares each digit of the path compression digit string 125 against successive semi-octets of the search object. All comparisons must indicate equality in order to proceed to the next node. If any of the comparisons fail, the search terminates at the node traversed immediately prior to the path compression digit string 125. By implementing path compression in this way, the TRIE database may be used to locate the best prefix for a search object. This would not be possible if the skipped semi-octets were not processed.

In preferred embodiments, the path digit string is stored at the child node. If a string is present at a child node, the string must successfully be matched against subsequent semi-octets of the search object in order to arrive at the child node. If the string match fails, the failure is treated as though a nil pointer were selected at the parent node.

This process is indicated diagrammatically in FIG. 6 by the interjection of the path digit string 125 between nodes 110-2 and 110-11. The existence of a path digit string in a node is indicated by a flag bit at that node. If this flag is set, the node has an associated path digit string; if not set, the node contains no such string. As can be seen in FIG. 6, flag bits have been included with each of the nodes 110.

Thus, pointer compression and path compression result in reduced memory requirements for a TRIE structured database while allowing exactly the same functionality as an uncompressed database.

The optimized TRIE structure described above requires some enhancements to allow it to properly process an OSI network destination address (NSAP) in the context of DEC-NET Phase-V routing. The mechanisms described so far provide for searches capable of finding exact matches and of finding maximal length prefix matches of the input address. These mechanisms must be enhanced in order to: (i) allow stored address prefixes which are shorter than the IDP to match addresses whose leading significant IDI digits are identical to the significant IDI digits of the stored prefix; and (ii) allow recognition of area addresses, prompting a transition to a Level-1 database (since network addresses are variable in length, it is possible for a stored area address to match the leading semi-octets of an input address without the input address meeting the requirement that it have precisely fourteen semi-octets remaining after the matching area address).

As an example to illustrate the requirement for the first enhancement, consider a prefix 37-123 stored in the database. In this example, the AFI "37" indicates that the IDP length is 16 digits (i.e. the IDI length is 14 digits). The digits that follow the hyphen, namely "123" are the leading significant digits of the IDI. Every address presented, for example by fetch unit 30, whose AFI is equal to "37" and whose leading significant IDI digits are equal to "123" should traverse a node in the TRIE that indicates a recognition of the prefix 37-123. Consider the following three addresses, as presented by fetch unit 30:

(i) 37000000000123456789abcdef
(ii) 370000000000000123456789ab
(iii) 37000000000000000123456789abcdef The first address has significant IDI digits equal to "12345". The second address has significant IDI digits equal to "123". The third address has significant IDI digits equal to "12". Thus the first and second addresses contain the prefix 37-123 but the third does not. Because there can be any number of padding digits in the IDI (between zero and eleven) in an address containing the above prefix 37-123, an unmodified address recognition tries would have twelve different branches for the prefix 37-123, each representing a different number of pad digits (in the range 0 through 11) and each leading to a distinct node labelled with the result corresponding to prefix 37-123. However, this structure is both inelegant and memory intensive.

A preferred way to store the prefix 37-123 is to treat all IDI pad digits; as discardable. Then the node storing the result corresponding to the prefix 37-123 is reached after the semi-octet sequence 3,7,1,2,3. In preferred embodiments, pad digits are easily discarded, without changing the basic operation of the TRIE. Pad digits are discarded by arranging the TRIE such that IDI pad digits select pointers 105 that point back to the parent node, rather than to a different child node. (As a consequence of this self-referencing, a node which corresponds to the first digit of the IDI cannot have an associated path compression digit string).

Without further modification, the third address in the example list above, once the IDI padding digits are discarded, will also travel along the path 3,7,1,2,3, and falsely indicate that it contains the prefix 37-123. To overcome this, two mechanisms are added to the basic TRIE: (i) a counter, the Remaining IDI Length Counter 43 (FIG. 3) which maintains a count of the remaining IDI digits of the input search address; and (ii) a seventeenth pointer, called the DSP pointer, which points from a parent node representing a digit of the IDI to a child node representing the first digit of the DSP. The seventeenth pointer is accessed when the IDI Length Counter is decremented to zero.

In operation, during a search of a network destination address, nodes in the TRIE reached after processing the second semi-octet of the address store the corresponding IDI lengths. That an IDI length is stored is indicated by an additional flag bit. Search unit 40 recognizes that the flag is set, reads the IDI length stored at the node and transfers it to the IDI Length Counter 43. Each time that a semi-octet is processed by search unit 40 (including the padding digits of the IDI), the IDI Length Counter 42 is decremented by one. When the IDI length is decremented to zero, the entire IDI has been processed. At this point, the seventeenth (i.e. DSP) pointer will be selected at the current node. Note that if the AFI value is 48 or 49, then there is no IDI; thus nodes in the database corresponding to these AFI values must provide an indication that the IDI Length is zero and must also provide a seventeenth pointer for immediate transition into the DSP domain of the database.

Figure 2A:
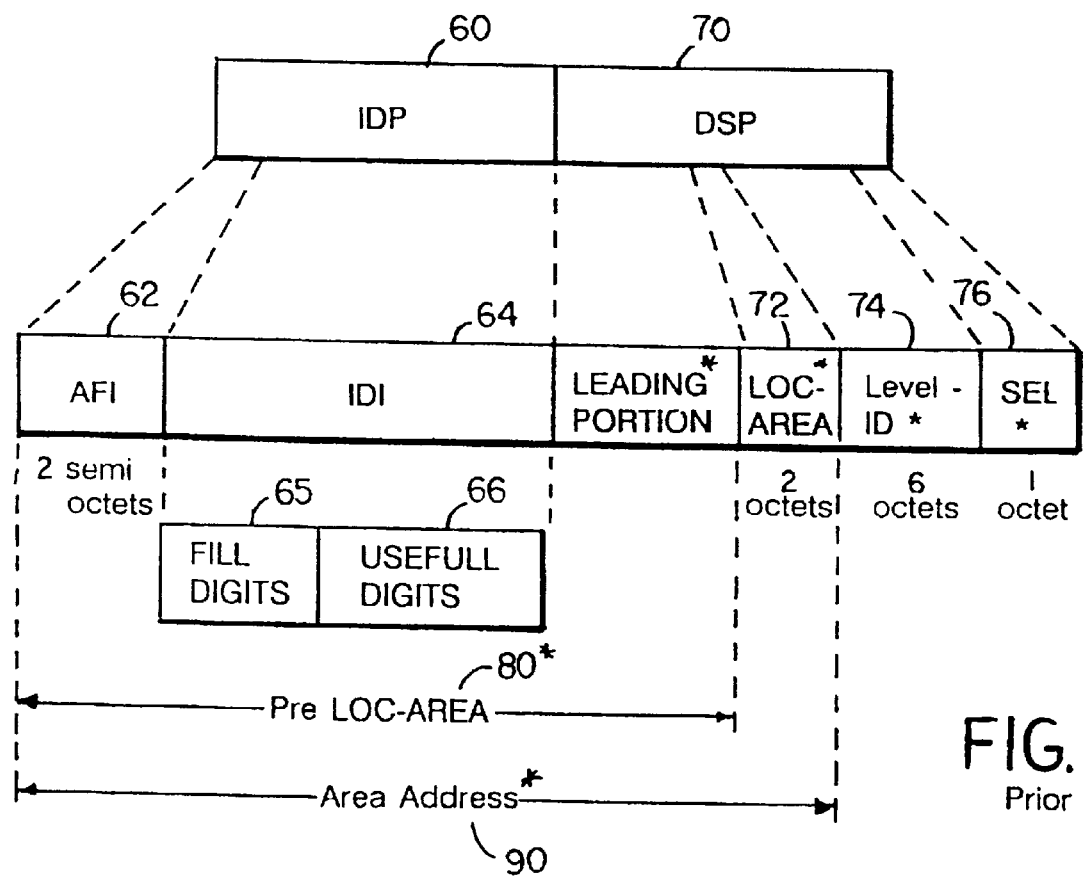
FIG. 2A is a diagram of an OSI network address format.

Another example illustrates the need for a second enhancement of the basic TRIE, relating to recognition of area addresses. Consider that a router is operating in a DECNET area defined by the area address 47123400000000abcd. By referring to FIGS. 2A and 2B, distinct fields of this area address can be recognized, as shown

| AFI | IDI | DSP lead | LOC-AREA |
|-----|------|----------|----------|
| 47 | 1234 | 00000000 | abcd |

Next, consider that the following three network destination addresses are presented to search unit 40 by fetch unit 30 (having been extracted from packets traversing the network):

(i) 47123400000000abcd0123456789ab00
(ii) 47123400000000abcd0123456ff
(iii) 47123400000000abcd01234567ff89ab00

The leading digits of the first address exactly match the area address of the area in which the router resides. The remaining digits can be interpreted as two fields: (a) a 12 semi-octet field 0123456789ab which is the DECNET Level-1 ID part of the address and (b) a two semi-octet field 00 which is the DECNET SEL field. Thus the packet from which the first address was extracted should be regarded as destined for an End System within this area, and should be routed by DECNET Level-1 routing. An exact match for the Level-1 ID part must be found in the database so that the packet may be forwarded to the correct End System.

The leading digits of the second address also exactly match the area address of the area in which the router resides. When the remaining digits are examined, there are nine. Thus, the remaining digits cannot be interpreted as a Level-1 ID part plus a SEL part; accordingly, the packet containing the specified destination address is not destined for an End System within the area in which the router resides. The incidental match between the leading digits of the destination address and the area address must be discounted; the longest prefix of the entire address should be sought in the Level-2 database, and the packet routed by Level-2 routing.

Similarly, the leading digits of the third example address exactly match the area address. Here again, the match must be discounted because the remaining digit string would be too long to interpret as a Level-1 ID part plus a SEL part. Again, the longest prefix of the entire address should be sought in the Level-2 database, and the packet routed by Level-2 routing.

When a search of the above three addresses is effected in a TRIE database, it is clear that they will all follow the same path until and beyond the node in the database corresponding to a match with the area address. As explained above, it is necessary for the first address to follow a different path once a match with the area address has occurred—at this point, a branch should be made to a subtrie which is a logically separate database holding all Level-1 addresses.

To allow for branches from the Level-2 database into the Level-1 database, a further, eighteenth, pointer is added to each TRIE node. In order to use the eighteenth, or "Level-1", pointer, two additional mechanisms are added to the basic TRIE: (i) a counter and comparator in a Current Remaining Length register (CRL 42 in FIG. 3), which indicate that there are exactly 14 semi-octets of the search object remaining; and (ii) an additional flag bit stored at each node, which is set only at the node or nodes in the TRIE that are reached after an exact match against the area address (i.e. the area address of the area in which the router resides). This flag bit will be referred to as the "Level-1 transition possible" bit.

The CRL register 42 is loaded with the length of the entire search object (i.e. number of constituent semi-octets) when it is first presented by the forwarding engine 14 to the fetch unit 30. Although not part of the address per se, the length of the address is included in the packet header as specified in ISO 8348/AD2. The CRL register 42 is decremented by one each time that a semi-octet is processed by search unit 40.

Only when the Level-1 transition possible bit is set and the CRL register indicates that there are exactly fourteen semi-octets remaining, will the eighteenth pointer be selected. The child node of the eighteenth pointer will be the root node of the Level-1 database. Note that the next semi-octet from the search object will not be consumed until after the transition into the Level-1 database.

In operation, if a transition into the Level-1 database takes place during a search of a network destination address, then the packet containing the address is destined for an End System within the area in which the router resides. As explained above, an exact match must be found in the Level-1 database for the Level-1 ID part of the destination address. That is, any former "best prefix" results that may have been acquired during the initial traversal of the Level-2 database are irrelevant once a transition into the Level-1 database has taken place. If an exact match cannot be found in the Level-1 database, the packet must be discarded since its destination address does not exist. Results returned from a search in the Level-1 database must therefore correspond to exact matches; otherwise, a nil result should be returned.

Figure 7:
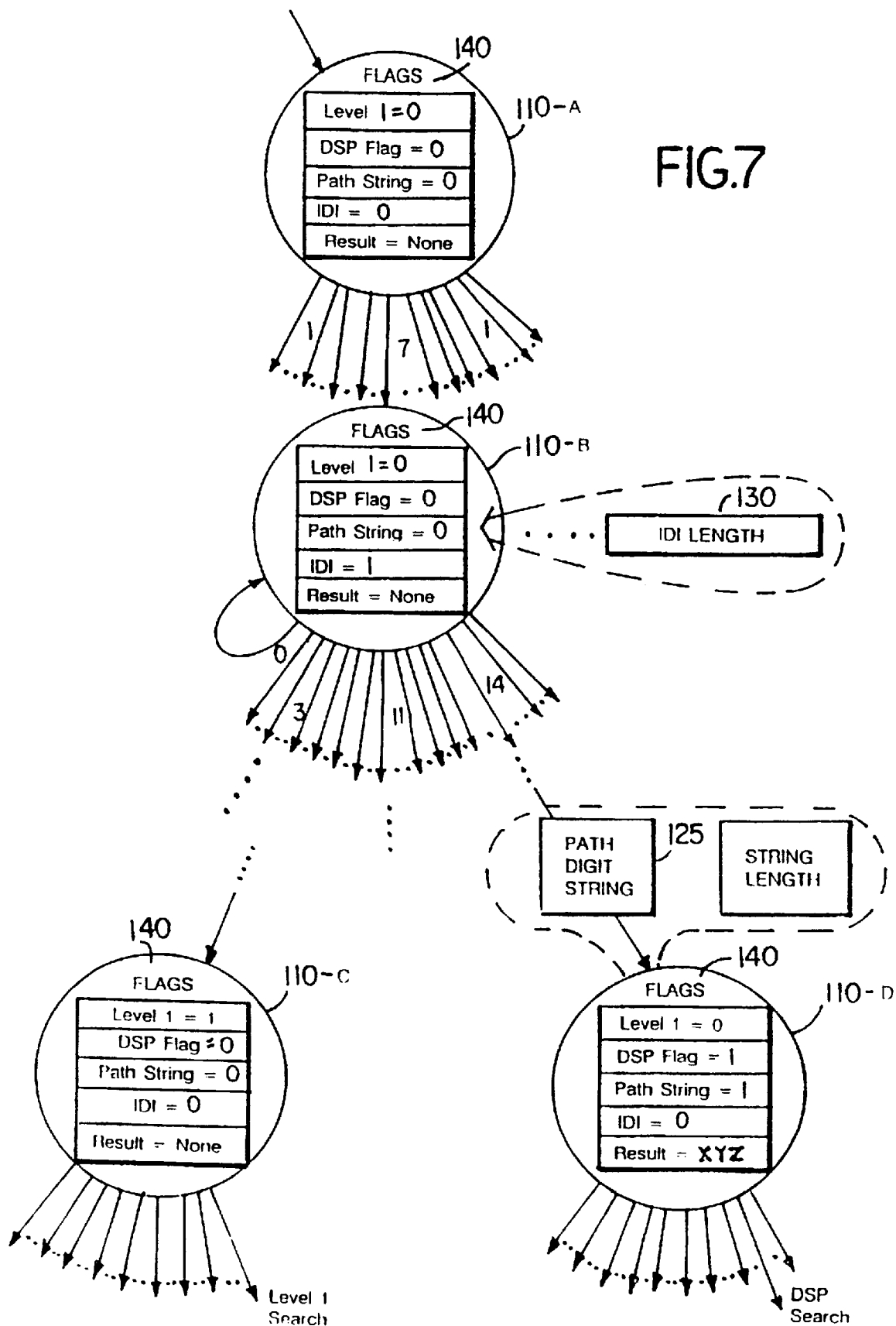
FIG. 7 is a diagram of a partial database structure illustrating the provisions for IDI, DSP and Level-1 processing.

Referring to FIG. 7, four nodes of a partial database are illustrated, and will be used as an example of the progression of a search through a database in accordance with the invention. In the example, path compression has been used, but pointer compression has not.

The search progresses as follows. An address search arrives at node 110-A. The Path String and IDI flags are checked upon arrival. Since both flags are not set ("0") in node 110-A, node 110-A does not require special processing. Therefore, the search uses the next semi-octet to index the array of pointers and proceeds to a child node. In the example, the fetched semi-octet has a value of 7, so the search unit 40 uses pointer seven to move to node 110-B.

Upon arrival at node 110-B, the search unit 40 sees that the Path String flag is "0", and thus node 110-B has no associated path digit strings. However, the "IDI" flag is "1". This indicates that node 110-B contains IDI information 130 which contains the length of the IDI field. (It can be assumed, therefore, that in all probability the semi-octet "7"that was just processed was the second AFI digit.) The search unit 40 retrieves this information, and loads the value into the IDI length register. This register will then be decremented by one every time a semi-octet is processed. The next semi-octet (the first digit of the IDI field) is fetched, and the search progresses.

In the example search, the AFI for the search path specifies that the IDI fill digits equal the decimal value 0. To ignore fill bits, the pointer in node 110-B corresponding to a semi-octet value of 0000 points to node 110-B. Therefore, as long as IDI fill digits are processed and the IDI length register is not decremented to zero, the search does not leave node 110-B. The search ordinarily leaves the node only after a non-fill (non 0000) digit is parsed.

In one path the search could subsequently follow, it would arrive at node 110-D, whose Path String flag is set. This indicates that node 110-D contains a path digit string 125. Before further processing at node 110-D, the search unit retrieves the path digit string 125 and compares the elements of the string with the subsequent semi-octets presented to the search unit. Only after the entire digit string has been successfully compared does the search unit further process node 110-D.

During further processing, the search unit discovers that the result field contains the value xyz, indicating that the semi-octets processed so far are a prefix having associated routing information (the prefix is associated with the result value xyz). The result value xyz is stored by the search unit. If no further result is encountered during the search, then the value xyz will be returned as the search result, indicating that the associated prefix is the best one stored in the database for this particular search argument.

Subsequently, the search unit discovers that the DSP flag is set. This indicates that node 110-D has a non-nil seventeenth pointer which points into the DSP domain of the database. (In an actual implementation, the DSP flag bit may be implemented by the use of nil and non-nil DSP pointers rather than with an explicit bit.) If and only if the IDI Length register has been decremented to exactly zero can this seventeenth pointer be accessed. If this is the case, the search will continue in the DSP domain of the database. If the IDI Length has not been decremented to zero, the next semi-octet of the search object is used to select one of the first sixteen pointers at node 110-D.

In another path the search could follow, it would arrive at node 110-C. At node 110-C, the Level-1 flag is set. This indicates that the semi-octets of the search argument that have been processed so far exactly match the Area Address of the area in which the router resides (i.e. the router that this database is contained within). If, at this point, there are exactly fourteen semi-octets of the search argument remaining, then the search argument will be regarded as an address of an End System within this DECnet Area; accordingly, the eighteenth pointer will be selected at node 110-C and the search will resume in the Level-1 subtrie.

Thus, each node contains several flags and possible pieces of information. Each node may contain (where pointer compression is used) an 18 bit pointer bit mask, 16 pointers to subsequent nodes (or to itself), a DSP pointer, a Level-1 pointer, a path compression string and an indication of its length, result information, and IDI length information.

DETAILED DESCRIPTION

A specific implementation of a search unit is described here. The design is driven by the desire to use a minimal number of readily available components and to minimize the power consumed.

The desire to use a minimal number of readily available components must be stressed. We have described above minimizing the use of memory through the techniques of path compression and pointer compression. By looking at these techniques from an implementation viewpoint, it may be decided that path compression should be implemented but pointer compression should not. Although pointer compression allows a reduction in the amount of memory required, it also requires that the memory be segmented into small pieces that are managed by some memory management process. Additional overhead includes extra logic to read and decode the bit mask, multi-level hardware adders to accumulate the significant bits of the mask and additional adders to then add this accumulation onto the address of the block of compressed vectors.

This overhead not only requires the use of extra control logic, but also reduces the potential cycle time of the machine because the extra logic is in the critical path of every cycle. By dispensing with pointer compression, the control logic is greatly simplified and the cycle time improved. The addition of more memory does not increase the component count to what it would be with pointer compression in effect. Different implementation requirements, especially those with larger databases, may make memory usage the greater consideration. Under these different requirements, pointer compression may be used effectively.

The recognition engine here is designed to fit into a "Widget-2"system. This system has a small 3-slot backplane, one slot of which is intended for some form of address recognition engine (ARE). The backplane bus is essentially that of a host 68020 Motorola microprocessor, but with only 24 rather than 32 address bits. The timing of the bus has been slowed down relative to the CPU in order to simplify bus interface logic. It is still possible to guarantee no more than two wait states (200 ns cycles) when the CPU accesses the ARE if performance requirements mandate this.

To permit maximum flexibility, the implementation supports eight different root nodes for initiating searches. The proper root node may be selected for searching different address formats or performing various types of generalized searches.

Central Components

Referring to FIG. 3, there are four basic components implementing memory 50 of recognition engine 20, and a number of registers and elementary state machines operating concurrently (collectively known as the search engine 40). The four central memory components are described below.

DRAM Pointer Memory

Figure 8:
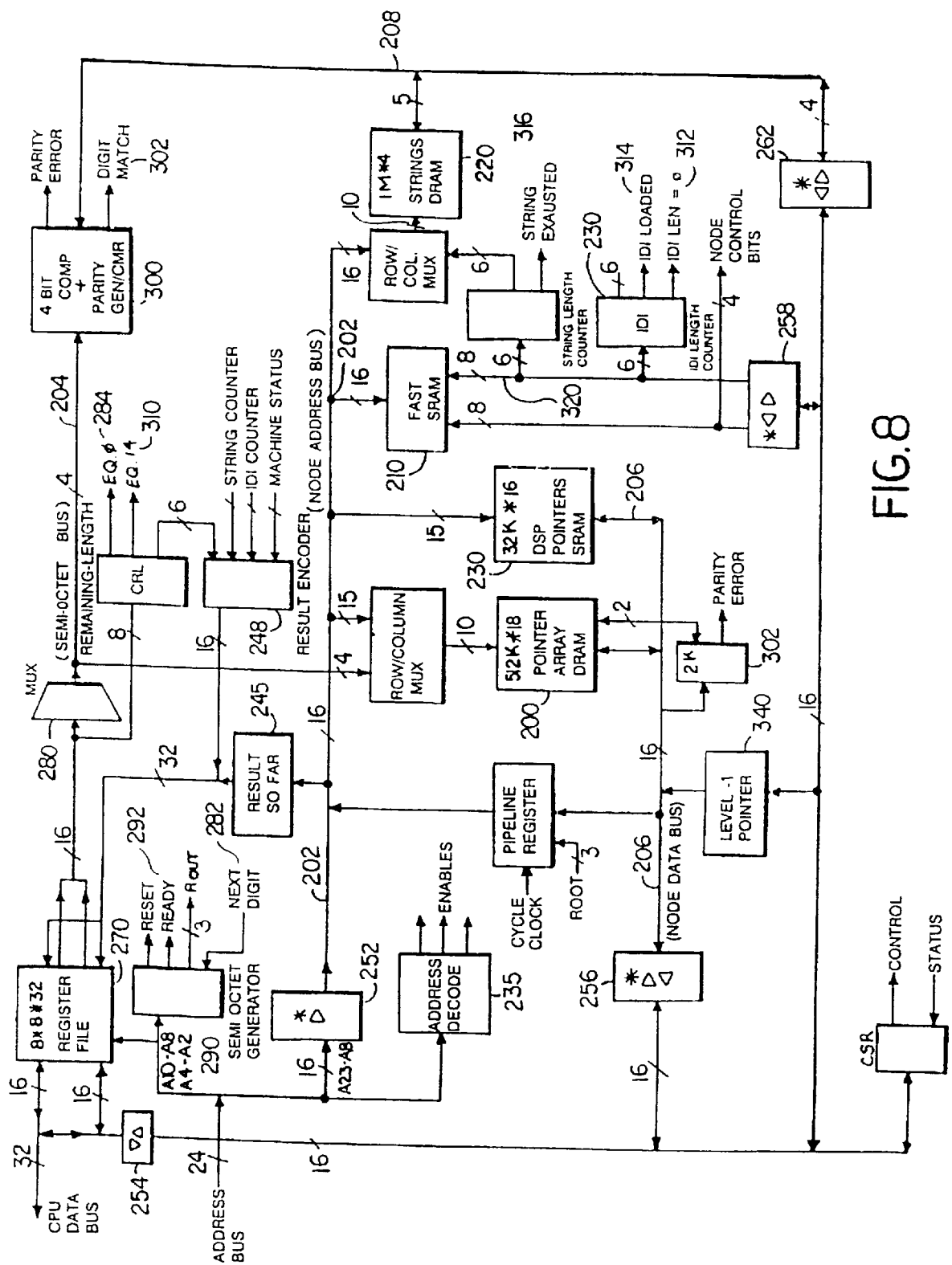
FIG. 8 is a diagram of the datapaths of a recognition engine.

The core of the recognition engine 20 consists of the node pointer memories and the "current node+current digit→next node" search unit 40. Referring to FIG. 8, the pointer memories are implemented by an array of DRAM memories 200 supported by a small amount of control logic. A 16-bit state vector (i.e. the node address carried by lines 202) and a 4-bit digit (carried by lines 204) requires a DRAM memory 200 organized as 1M×16 (20 bits×16 bits) and allows 64K states (or nodes) to be implemented. This allows at least 32K addresses to be recognized; in fact, by asserting that there are 32K nil nodes (with no "next state" child nodes) and 32K non-terminal nodes with next states, then only half as much physical memory is required, i.e. only one Megabyte (organized as 512K×16). A DRAM array 200 of this size requires only eight (256K×4) chips, or (looking ahead in memory technology) only four (1M×4) chips.

The basic machine cycles DRAM array 200 at the highest possible speed, and this speed largely dictates the search time for any given address (assuming that there is time to generate the DRAM address for the next cycle after the data for the current cycle has become valid; this can easily be managed, as the next DRAM address is essentially a concatenation of the 16-bit pointer data with the 4-bit digit).

A node is thus defined by a 16-bit address carried on lines 202. If the most significant bit of the address is equal to zero, the node is defined (in this implementation) to be terminal (with no next-node pointers), but is non-terminal (i.e. has next-node pointers) otherwise.

Fast Static RAM

All 64K nodes must provide the extra information (in addition to the pointers to next nodes) that has been alluded to earlier. To supply this information, a fast 64K×16 static RAM 210 is accessed concurrently with DRAM pointer array 200. The static RAM provides the following information about the current node:

NIL Flag: set if node is NIL (and processing should halt);

Path String: if a path string stored at the node, a non-zero length is stored in SRAM;

Result Flag: set if node contains a new result value;

IDI Flag: set if AFI done (and node contains IDI length);

Level-1 Flag: Level-1 transition possible (DECnet area recognized at this node).

The mapping of this information into physical memory will be more fully discussed later, under the heading "Memory Map".

Path Digit String Memory

The Path Digit String Memory 220 is accessed concurrently with the DRAM pointer array 200. String storage space is allocated for each of the 64K nodes. The number of digits stored at each node is indicated by the string-length field that is stored in the fast static RAM 210. The maximum number of digits that can be stored at a node is determined by the address of the node. There are three different maxima: 48 digits, 16 digits, or zero digits. The node address on lines 202 determines which maximum is in effect; the assignment is partly hard-wired and partly logic-programmable and is designed to minimize the amount of physical memory.

The implementation supports 48 digits of storage at 4K nodes and 16 digits of storage at 52K nodes. 8K nodes have no string storage space. The total memory required is 1M digits which is 512K octets or four (1M*1) chips. Again, with next generation 4 Mbit DRAMs, only one chip is required.

According to the invention, techniques are used to map the node address (16 bits) and the value of the string-digit-counter (6 bits) onto the 1M*4 DRAM address lines (20 bits). In effect, the mapping changes as a function of the node address lines. This will also be further detailed in the section entitled "Memory Map" below.

DSP Pointer Memory

The DSP Pointer Memory 230 is also accessed concurrently with the DRAM pointer array 200. Only 32K of the nodes, known as "transition nodes" (where the node address MSB is equal to one) can access this memory. The memory requirement is thus 32K*16, equating to only two chips. The DSP pointer accessed at a node will only be used when the end of the IDP is recognized; i.e. after an IDI search when the CRL counter is decremented to zero.

Control Logic

Central components of the control logic for the ARE are described below:

The timing generator (not shown) is responsible for the correct sequencing of the memory arrays; e.g. RAS and CAS control, refresh timing, cycle-to-cycle control, etc.

The fetch unit 280, 290 is responsible for supplying semi-octets of the address to the search unit on a demand basis. The semi-octets are extracted in order from the search address as supplied (in this case) by the host CPU to a register file 270. The semi-octets are presented to the search engine and are synchronized to its timing generator. Interlock is provided, in that if the search engine requires a semi-octet that the host CPU has not yet supplied, then the search engine is stalled until the semi-octet is ready.

There are three digit-counters that are capable of concurrent operations:

The current remaining length (CRL) counter 240 is loaded with the semi-octet length of the entire search argument when it is first presented by the CPU to the recognition engine. The counter is decremented by one whenever a digit is consumed (processed) by the search engine. If the count reaches zero, it is an indication that the search must terminate.

The CRL counter 240 also provides a signal on line 310 to the Cycle Controller (not shown, see description under Cycle Controller, below) that exactly fourteen digits of the search argument remain, for the purpose of making a Level-1 transition.

The Remaining-IDI-length IDIL counter 250 is loaded with the length of the IDI that is dictated by the AFI value (as specified in the DECNET Phase-V routing specification). The loading takes place under command of a control bit set at a node (the node immediately following the second AFI digit). This counter is also decremented by one whenever a digit is consumed by the search engine; if the count reaches zero, then the next machine cycle must be a DSP transition cycle. The value of the IDIL counter is reset to −64 each time a new search starts. The value −64 indicates "length not loaded".

Note that the ARE may be used to search arbitrary words in an arbitrary database; it is not necessary to load the IDIL counter (if it is not loaded, then a DSP transition cannot and will not be made).

String-digit-counter 260 is always reset to zero upon entering any node. The counter is incremented at the end of every machine cycle that is a string-digit comparison cycle; thus this counter will remain reset to zero until a node is reached at which a constant string is stored. If a string of length N digits is stored at a node, then the string digit counter will increment from the value zero through N minus one, as N string digit comparison cycles take place (assuming that the comparisons are successful). When the string-digit-counter reaches the value N, no further comparisons take place; the counter is reset to zero in the next machine cycle.

The cycle controller (not shown) might be regarded as the central intelligence of the search engine. It sees status information about the current machine cycle and control information from the Node Control Word on bus 330. The cycle controller decides how to continue with the present cycle (i.e. whether to compare a string digit, select a pointer for another cycle, or stop); whether to start another machine cycle, and, if so, whether to use a new digit and/or a new node address. The cycle controller also generates signals to various registers and counters.

Status registers 245, 248 are used to save the node address of the most recently traversed prefix (i.e. the best prefix so far), and to save useful past history; in particular, whether DSP and/or Level-1 transitions have taken place, whether the "best prefix so far" has ever been loaded, whether the remaining-IDI-length register 250 has been loaded.

Host CPU access transceivers 252, 254, 256, 258, 262 allow the host CPU to access the internal memories of the ARE for maintenance purposes. The concurrent operation employed by the search engine is disabled for this purpose; the memories collectively appear to the host CPU as a single database with what is intended to be a "programmer friendly" structure and address map. In this structure, all of the data associated with a particular trie node appears within a uniformly organized data structure.

Functional Interfaces to the ARE

There are basically three functional interfaces to the ARE. These are:

1. Search interface—packet forwarding;
2. Search interface—maintenance;
3. Maintenance interface.

The first of these is straightforward; it may be considered as the primary reason for constructing an ARE. In this mode, forwarding addresses (and/or other addresses, e.g. datalink addresses) that have been extracted from packets traversing the network are presented to the ARE. The ARE performs a look-up on the addresses and returns forwarding information to a forwarding engine (in this case, the forwarding engine is the host CPU).

The second and third functions are both concerned with maintenance. The search interface for maintenance is very similar to the search interface for packet forwarding. In this case though, addresses presented to the ARE are not necessarily complete addresses. Typically, address fragments are presented in order to determine what structural changes to the database are required to add, delete or modify entries. A slight modification to the operational behavior of the ARE is used for maintenance searches, to cope with the subtle differences of the address semantics.

The maintenance interface involves no searching; indeed, the search engine is inhibited from operating in this mode. The address, data and control paths within the ARE are completely restructured so that the internal memories of the ARE are made visible to the host CPU. Each memory component of the ARE is then accessed by decoding the CPU address lines, rather than by a search engine.

The CPU interface to the ARE for the purpose of performing a search is functionally the same, whether the search is for the purpose of forwarding a packet or of inspecting the database. The interface is supported by direct memory mapped control, status and data registers. The control registers allow the mode of operation of the ARE to be controlled, while the status registers allow the operation of the ARE to be monitored. The data registers provide a means of presenting an address to the ARE and of reading a search result.

The control registers provide control of the following:

1. Select search mode or maintenance mode;
2. Select address format mode (influences the interpretation of results);
3. Inhibit: Level-1 transitions (for maintenance searches);
4. Inhibit: IDP to DSP transitions (maintenance searches);
5. Select poll or stall until search result complete;
6. Control parity protection of ARE memories.

The status registers allow the following to be monitored:

1. State of search engine (reset, searching, halted);
2. State of address input to search engine.

The data registers are broken into eight blocks. Each block corresponds to a search initiation at one of eight root nodes, but otherwise the blocks are functionally identical. (Some of the eight root nodes may begin databases used for different types of searches, others may correspond to the start of, for example, Level-1 branches of an address search database.) A register block is 64 bytes in size; the second 32 bytes being an alias of the first 32 bytes (i.e. using the same physical memory). Of the 32 physical bytes in a block, up to 24 bytes may be used to write an address to the ARE that is to be searched. The first byte must be a length indication of the entire length of the address to be supplied. (Note that this format allows direct extraction from ISO 8348/AD2 packets traversing the network). The choice of which alias to write the address into determines whether the length byte will be interpreted as the length of the address measured in octets or measured in semi-octets. An octet length allows direct extraction from a ISO 8348/AD2; a semi-octet length allows arbitrary length prefixes to be searched, which is particularly useful for maintenance searches. The maximum length address that can be searched (in the current implementation) is 23 octets or 46 semi-octets.

The search operation will start as soon as the first four octets of the search address are written. An interlock mechanism prevents the search engine from using octets five through eight until these also have been written by the CPU. Similarly, the interlock is provided for the remaining octets in groups of four. Note that four octets may be written with one write operation, as the ARE has a 32 bit data interface. Note also that the search address, including the length byte, must be padded out with arbitrary data if necessary to be a multiple of four octets in total length.

The search result will be written by the search engine into the same block that the search address was written into by the CPU. The status of the search engine can be monitored by the CPU (using status registers 248) to determine when the search result is valid; or, alternatively, an interlock can be enabled so that the CPU is stalled when reading the result until the result is valid.

The search result is a group of eight bytes. The group is broken up into the following fields:

1. Summary (1 byte);
2. Result-so-far (2 bytes);
3. Got-so-far (2 bytes);
4. Internal counter values (3 bytes).

The summary byte provides rapid detection of search success or failure. In the case of a search success, in packet forwarding mode, the result-so-far provides an index into a remote table (i.e. external to the recognition engine) that provides all the necessary forwarding information. In the case of search failure, particularly in maintenance searches, the summary indicates the reason for failure. The other fields provide sufficient information to allow the ARE database to be easily and rapidly updated by the CPU if desired. Further details on these registers and their interpretation is provided later in the disclosure.

The CPU can put the search engine into "maintenance" mode (rather than "search" mode) by writing to a bit in the control register.

When in maintenance mode, the search engine does not function and all previously acquired status (except for the database) is lost. In this mode, all of the internal memory of the ARE is mapped into some part of the CPU address space. This part of the address space is not accessible unless the search engine is in maintenance mode. (This greatly simplifies arbitration for the internal memories and buses, and is consistent with the goal of minimum parts count).

Memory Map

The mapping is organized as 64 K of consecutive nodes; each node is 256 octets in size. Thus the total virtual space spanned by the memories is 16 Mbytes. The memory map of each node is shown in FIG. 9; the physical memory parts making up various fragments are shown in parentheses.

In this memory mapping scheme, a resource within a node N that has an offset (as shown in FIG. 9) of m is addressed with the CPU-supplied address:

N*2^8+m; i.e. the concatenation of N followed by m.

Some hard rules are enforced with the mapping scheme of FIG. 9. The rules are:

1. All nodes with address less than 8000 hex are terminal nodes. A path digit string may be stored at some terminal nodes, but a transition to another node is strictly not allowed at any terminal node.

2. There are 4K of nodes with provision for up to 48 semi-octets of path digit string storage. Half of these nodes are terminal nodes (Nodes 7800–7fff hex) and the other half are transition nodes (Nodes f800–ffff hex). These nodes are provided primarily for storing Level-2 entries in the database.

3. There are 52K of nodes with provision for up to 16 semi-octets of path digit string storage. Half of these nodes are terminal nodes (Nodes 1000–77ff hex) and the other half are transition nodes (Nodes 9000–f7ff hex). These nodes are provided for storing Level-1 entries, datalink addresses and other entities of total length not exceeding 16 semi-octets in the database.

4. There are 8K of nodes with no provision for path digit string storage; this is a consequence of giving up what would be storage for 16 semi-octets and allocating the memory to the 4K of nodes with 48 semi-octet storage. These nodes can be used, however, for example for those nodes where an IDP count is located within a node (and string storage is thus not allowed) or for any node where a constant string is not present.

5. There is only one Level-1 pointer. It is accessible at all transition nodes. The pointer should be set to point to the root of the Level-1 branch of the database.

Theory of Operation for ARE

The basic theory of operation for a search according to the invention is described here. It is assumed that the CPU will have built a valid database trie structure before searching starts.

Referring to FIG. 8, a register file 270 is used to provide the necessary memory for holding the search address that the CPU provides to the ARE, and for holding the result to be returned to the CPU. The register file 270 is dual ported, allowing concurrent access by the ARE and the CPU. This improves performance and obviates the need for arbitration control logic.

Searching is initiated when the CPU writes the search argument into the register file 270. In particular, when the CPU writes to the third octet of a longword entry (this will usually be concurrent with writing the whole longword) a hardware flag is set that indicates that the associated longword contains valid data. At the same time, the block chosen is remembered for the purpose of starting the search at the correct root node; and the alias used within the block is remembered so that the first octet can be properly interpreted as an octet or a semi-octet length.

There are six "ready" flags, one for each of the first six longwords in a block. The flags are cleared in one of two ways: either the CPU explicitly clears them by issuing a maintenance mode command (and by subsequently returning the mode to search mode); or the CPU overwrites the search argument with a new search argument. Overwriting the first longword will generate an ARE system reset but will leave the first longword "ready" flag set. The latter method allows multiple searches to be performed with little or no control overhead.

Control logic 290 around the register file 270 tests the flags and routes the longwords (when they are ready, i.e. valid) to a multiplexer 280 built in a couple of programmable logic arrays. The multiplexer 280 output feeds semi-octets of data to the search engine on bus 204 and generates a "data ready" indication. If "data ready" is stalled (because the CPU cannot fill the file as quickly as the search engine can empty it) then the search engine will also stall. The register file control logic 290 looks for a "next digit" signal on line 282 from the search engine whereupon it will drive the next semi-octet onto the multiplexer 280 output bus. Synchronization of the "ready" flags occurs in parallel with the serialization of each longword into eight semi-octets; this pipelining technique allows the overhead of synchronization to be completely recovered.

The first octet in a register file block (i.e. the octet with the lowest address) is routed to the CRL register 240. If the length is to be interpreted as an octet-length (rather than a semi-octet length), then its value is doubled so that the CRL register 240 always holds a semi-octet count. The second and subsequent octets are all routed to semi-octet multiplexer 280. For each octet entering multiplexer 280, the most significant four bits will be output first, followed by the least significant four bits. When each semi-octet is valid on the semi-octet bus 204, control logic 290 signals "ready" on line 292. If and when the Next Digit signal on line 282 is asserted, the CRL register 240 is decremented by one and a semi-octet is consumed. After all of the semi-octets have been output onto the semi-octet data bus (lines 204), the semi-octet generator logic will still indicate "ready" on line 292 to the search engine even though there are no more semi-octets. If "next digit" is asserted on line 282 to the control logic 290, undefined data will be driven onto the semi-octet data lines 204. However, the data will be qualified with an indication that the "remaining length is zero" (RLEQ0) on line 284.

As soon as "data ready" is indicated for the first semi-octet on semi-octet data bus 204, the first machine cycle starts. The cycle starts by driving a valid digit onto the semi-octet data bus 204 and a valid node address onto the node address bus 202. The node address used for the first machine cycle (i.e. the root node address) will be one of the eight values 8000 through 8007 (hexadecimal) as determined by which of blocks zero through seven was loaded with the search address.

A machine cycle is equal (in time) to a DRAM cycle. The master crystal oscillator frequency is selected to minimize the cycle time but also guarantee proper DRAM operation under worst case conditions. This time is approximately 208 nanoseconds per machine cycle.

A general case machine cycle will be considered. This general case includes the very first machine cycle. Machine cycles will execute back-to-back with no delay, unless there is a delay in obtaining the next digit (indicated by "data ready" being negated), caused by an unduly slow load of the register file. Approximately every 15 microseconds, a machine cycle will be donated to the cause of refreshing the DRAM arrays; no search progress is made during these refresh cycles.

At the beginning of the machine cycle, the current node address is driven onto the node address bus and the current search address digit is driven onto the digit data bus. Concurrent access is made to the following memories:

1. A next-node pointer is fetched from pointer DRAM array 200;
2. A DSP pointer is fetched from DSP pointer static RAMs 230;
3. A next string digit is fetched from path digit string DRAM array 220;
4. String/IDI length and control bits fetched from fast static RAMs 210.

The next-node pointer and the DSP pointer both contend for node data bus 206, as does the Level-1 pointer data register 340. Control logic will decide which contender is enabled onto the bus (see below).

The next string digit is enabled onto bus 208, and is compared with the current search digit on bus 204 (even if there is no string digit). The comparison is made by comparator 300. The comparison status, indicated by the "digit match" signal on line 302, is made available to the control logic.

The control information fetched from the fast static RAMs is available relatively early in the machine cycle, after approximately 60 ns. By this time, additional status information is available from registers and control circuits within the search engine. This additional status includes:

1. CRL=14 (line 310): 14 semi-octets remain, Level-1 transition possible.
2. CRL=0 (line 284): last digit has been used.
3. IDIL=0 (line 312): IDIL has been decremented to, or is being loaded with zero.
4. "IDI loaded" (line 314): prevents IDI reloading at a fill digit looping node.
5. "string exhausted" (line 316): indicates that the value in string digit counter 260 is equal to the "string length" field from the fast static RAM (carried on bus 320)—both values are 0 if there is no string stored.

The setting of the above status bits together with the Node Control Information carried on bus 330 from fast static RAM 210 determines what will happen the second half of this machine cycle. Basically, the machine cycle will be one of four types:

1. String digit comparison cycle (string cycle);
2. Level-1 transition cycle (Level-1 cycle);
3. IDP to DSP transition cycle (DSP cycle);
4. Normal next-node pointer cycle (pointer cycle).

Types 2, 3 and 4 may be collectively referred to as a "normal cycle"; there is nothing abnormal about a "string cycle" other than that the search engine does not progress to a new node.

The following description of how the cycle type is decided is given in a sequential form; the search engine however makes all these decisions concurrently:

If "load IDI length" (a node control bit on bus 330) is asserted and "IDI loaded" (on line 314) is false, then the IDI length will be loaded into this register and "IDI loaded" will be asserted. "IDI length=0"(on line 312) will be asserted whenever the register contents are zero and "IDI loaded" is asserted.

If "load IDI length" is negated, string comparison may be called for. If "string exhausted" (on line 316) is asserted, this is a "normal cycle"; otherwise, this machine cycle will be a path string digit comparison cycle. In the latter case, the next-digit and DSP pointers are ignored. The machine waits until the "digit match" flag (on line 302) is valid (after about 180 ns) and then, if it is negated, a string mismatch is declared and the machine stops. If "digit match" is asserted, then "next digit" (on line 282) is requested from the semi-octet generator; string count register 260 is incremented; IDI length register 250 and CRL register 240 are decremented. The machine ends the current cycle and starts the next cycle without changing the value on node address bus 202.

String comparison cycles will continue to take place until there is a digit mismatch or until "string exhausted" is asserted on line 316, indicating that all digits have successfully been matched, or until "CRL=0"is asserted on line 284 by CRL counter 240 (considered also to be a mismatch). Whenever "string exhausted" is asserted on line 316, string count register 260 will be reset to zero in the next machine cycle (even if it is already zero).

A "string cycle" will not take place if "string exhausted" is asserted during the machine cycle, because "string exhausted" is only asserted when (1) there is no path digit string at the node; or (2) the string at the current node has already been successfully matched. A "string cycle" will not take place if "load IDI length register" is asserted, because there can be no string if there is an IDI length stored at the node (because only one field in memory is provided for storing length information—when an IDI transition occurs, this field stores the IDI length and thus cannot store string lengths).

A "normal cycle" will select one of three potential next node addresses from three sources: the next-node pointer, the DSP pointer and the Level-1 pointer. The selection will be made according to the following rules:

(a) If "IDI length=0" is asserted on line 312, and "IDI loaded" is asserted on line 314, and DSP transitions are globally enabled, then a "DSP cycle" is selected. The value of the DSP pointer accessed from memory 230 becomes the address of the next node. Only one "DSP cycle" is allowed during the search operation, which prevents the search engine from being stuck in infinite loops.

(b) If (a) does not apply, if "CRL=14"is asserted by counter 240 on line 310, and if the "Level-1 transition" flag is set at the current node, then, if Level-1 transitions are globally enabled, the Level-1 pointer accessed from register 340 will be the source of the next node address. In this case, the cycle is a "Level-1 cycle". Again, only one "Level-1 cycle" is allowed per search operation.

If either (a) or (b) apply, then the next machine cycle will be run without fetching a "next digit" from the semi-octet generator. That is, the same digit will be re-examined once the Level-1 or the DSP transition has been made. If neither (a) nor (b) apply, then the "next node pointer" accessed from pointer DRAM array 200 will be the source of the next node address—i.e. this machine cycle will be a "pointer cycle". In this case, "next digit" will be asserted on line 282 to semi-octet generator 290 so that the next digit is available at the beginning of the next machine cycle. CRL register 240 and IDIL register 250 are both decremented.

For any "normal cycle", the following rules also apply: If the most significant node address bit is equal to zero, or if the "NIL node" flag is set, then this machine cycle will be the last for the current search argument (i.e., current network address being searched). If the "save current node address" flag is set, then the node address of the current cycle will be saved in "result so far" register 295 (only if this is not a nil node), overwriting any former value.

For a "string cycle", or for a "pointer cycle" (i.e. any machine cycle that absorbs a search digit), the current machine cycle will be the last if "CRL=0"is asserted on line 284. In the case of a "string cycle", a string mismatch is declared. In the case of a "pointer cycle", the current node is declared to represent the greatest progress that can be made on the search address. If the signal "CRL=0"is asserted during a "DSP cycle" or a "Level-1 cycle", then the appropriate transition can still be made since it does not require a valid semi-octet to be present on semi-octet data bus 204.

Errors in the database may be recognized by the machine, causing premature error termination. The following errors will be recognized:

1. A parity error between the current semi-octet and the current path digit string, as detected by parity check element 300;
2. A parity error in pointer DRAM array 200, as detected by parity check element 302, if the error occurs during a "pointer cycle" (i.e. when data from this memory is to be used as the next node address);
3. When string length counter 260 has been incremented beyond the legal range during a "string cycle".

Once the machine has stopped cycling, the "BUSY" status bit is cleared and the result of the search can be read by the CPU. Appendix B details the format and interpretation of the search result.

Performance prediction for ARE

Search time

The performance of the ARE is relatively easy to predict. The search time will be roughly equal to the number of digits in the search argument multiplied by the machine cycle time. Some overhead must be added to this estimate.

Once every 15 microseconds, a machine cycle will be run to refresh DRAMs 200, 220. Only one such "extra" cycle can be expected per search. Additionally, there may be two other machine cycles where a digit is not absorbed: a "DSP cycle" and a "Level-1 cycle". According to the invention, as discussed above, intrinsic hardware interlocks prevent more than one of each transition cycle per search argument, even with corrupted databases.

Thus, if the maximum length of a search argument is forty digits, then it will take at most 44 machine cycles to process the argument. (This includes one final "dummy" machine cycle, run with no valid semi-octet on semi-octet data bus 204). To this must be added the overhead of loading the input and reading the output registers. This calculation is difficult, especially when the data write and data read cycles are referenced to the instructions that cause them.

The CPU register load cycles can all run with at most two wait states. The first machine cycle can start as soon as the first register file load cycle is detected. This time is of the order 300 ns measured from the start of S0 of the CPU write cycle to the start of the first machine cycle. For reading the result, CPU DSACK signals can be asserted (or rather, the blocking of them can be released) coincidentally with the end of the last machine cycle. The end of S5 of the CPU read cycle will then occur within 150 ns.

The CPU will typically transfer six longwords (up to 46 digits, only up to the first 40 being significant) to the register file. The time measured from the start of the first transfer to the end of the read cycle reading the result will be, for a 208 ns machine cycle:

$$300 \text{ ns} + 44*208 \text{ ns} + 150 \text{ ns} = 9.6 \ \mu s.$$

To give a more accurate figure for the available spare CPU time, the transfer time of six longwords should be subtracted from this figure (6*200 ns=1.2 $\mu$s). This gives a result of 8.4 $\mu$s.

The look up time of a Level-1 address or IEEE 802.3 datalink address is much less. If the CPU prepends the address with an octet of value "12", and then transfers the result to register file 270, two longword writes will be required (the last octet of which is ignored). By making use of the fact that data in register file 270 is not overwritten, one of the eight input blocks (and, correspondingly, one of the eight root nodes) may be dedicated to Level-1 look ups—once the first octet is written with the value "12", it will stay there. In this way, the Level-1 address can be written directly to the file. This will still require two write operations, but at least three CPU bus cycles will be run by the interface hardware because of the misalignment.

The root node for Level-1 look up will (presumably) be the same as the initial node in the Level-1 branch of the database; no domain transitions can be expected. If a refresh cycle happens during the look up, the look up time will be 12 digits+refresh+dummy:

$$300 \text{ ns} + 14*208 \text{ ns} + 150 \text{ ns} = 3.4 \ \mu s.$$

Subtracting the time for (probably 3) write cycles gives an effective look up time of 2.8 $\mu$s.

Database capacity.

The database capacity of the inventive ARE presented here is relatively easy to calculate. Two database types are considered to coexist in the ARE: those allowing addresses up to 16 semi-octets in total length to be recognized; and secondly, those allowing addresses up to 40 (potentially 46) semi-octets to be recognized. A total of up to eight different databases can coexist, limited by the number of root nodes.

The former databases are used for recognizing Level-1 addresses, datalink addresses and router-IDs amongst others. Given that there are 52K of nodes with up to 16 semi-octet constant string storage at each node, of which 26K are terminal, it follows that a combined total of up to 26K entries for these databases can be guaranteed. (In the worst case, each transition node will have at most two next-node pointers; thus the trie becomes a binary trie with as many transition nodes as final nodes.)

Since there are 4K of nodes storing constant strings up to 48 semi-octets in length (of which 2K are terminal), at first it seems reasonable to suppose that up to 2K entries can be guaranteed for searching these longer addresses. However, in the worst case, extra transition nodes may be required—these extra nodes having one exit only, namely the DSP pointer exit. (The DSP transition cannot be stored as part of the constant string.) Under these conditions, only 1K entries can be guaranteed. Note that it is possible to redefine the ARE so the DSP transitions are allowed from terminal nodes—then the guarantee increases to 1.3K entries in the worst case. Note also that it is possible to steal nodes from the other databases and "chain" together the nodes with smaller constant string capacities. In fact, the current maximum length IDP defined is only 18 digits in length—hence, even the 16-digit capacity nodes can be used for holding IDP digits without fear that constant string storage length with exceed node capacity. (If the maximum length IDP is 18 digits, then the maximum length IDI will be two less—AFI digits are not ordinarily stored as part of a constant string.)

For packet forwarding purposes, note that the Level-2 database is branched to the Level-1 database through the Level-1 pointer. Thus it may be stated that a database can be built that guarantees recognition of up to 26K addresses that are in-area (and will be routed by Level-1 routing) and up to 1K addresses that are out-of-area (and will be routed according to longest prefix).

Other embodiments are within the scope of the claims that follow the disclosure.

For example, the invention may be used for searches of any large database that contains strings of (possibly widely) varying length. Such databases are common: examples include directory look ups in a telephone context, on-line dictionaries, spelling checkers, looking up social security numbers, etc. In any such context, where the directory look up is performed using a search trie, the invention would be applicable. Although the word "node" has been used here to describe an element in a hierarchical tree structure, the invention applies to any tree structure search, whether or not the word "node" is used to describe the tree structure.

ARE Memory Map

The ARE is mapped into a 16 MB space in the Widget memory map, between addresses 0800 0000 and 08ff ffff.

The 16 MB ARE space is divided into 64K "nodes", where each node is 256 octets in size. Thus, an ARE address (consisting of eight hexadecimal digits) may be broken up into three fields, as shown:

08|nnnn|aa

Were the first two digits, "08", select the ARE; the next four digits, "nnnn" select one of 64K nodes; and the final two digits, "aa" select a subspace within a node.

The allowable subspaces that can be accessed at each node are defined in FIG. 9.

Description of resources

Node Control Word

The node control word is a byte-addressable 16-bit word supported at every node. Not all bits are interpreted by the search engine, but all bits are implemented to facilitate ARE maintenance (e.g. by chaining free nodes). The format and explanation of this word is given below

| NIL | SR | IC | L1 | d11 | d10 | d9 | d8 | d7 | d6 | <--LENGTH--> |
| --- | --- | --- | --- | --- | --- | --- | --- | --- | --- | --- |

NIL (Nil Node): If this bit is set, then this node is interpreted by the search engine as a nil node. At a nil node, the setting of any other control bits is irrelevant. Immediately upon entering a Nil Node, the search engine will stop, indicating "Nil Node" as the reason for stopping. Any string stored at a Nil Node is ignored. The address of the Nil Node is not reported in any result returned by the search engine.

NOTE: All nodes whose address MSB is equal to zero (i.e. nodes 0000 through 7fff) are Terminal Nodes. During a search operation, if at Terminal Node is encountered the search engine will stop rather than to make a transition from the node.

SR (Save Result): During a search operation, all nodes encountered that have this bit set will be saved in Result So Far register 245. This single word register 245 will always contain the address of the node most recently encountered with the SR bit set. The SR bit will not be examined by the search engine until any constant string present has been successfully matched against the search key; string mismatch (which includes premature exhaustion of the search key digits) will result in the node NOT being saved, despite the condition of the SR bit. The node address will not be saved if the node is NIL.

IC (IDP Count present): If this bit is set, then the value of the "length" field will be interpreted by the search engine as the length of an IDP. This bit should be set at the first node following the second digit of the AFI. The length field should be set to the appropriate IDP length that is indicated by the relevant AFI. Only one such value will be loaded during a search operation. The IC bit will be ignored if the node is NIL.

NOTE: A constant string cannot be stored (and will be ignored) at any node with the IC bit set.

L1 (Level-1 transition possible): This bit will be examined by the search engine only when it has exactly fourteen digits of the search key remaining and it has successfully matched any constant string present against the search address. If this is the case, and the L1 bit is set, then the search engine will use the value of the Level-1 pointer as the address of the next node.

d11,d10, . . . ,d6: These bits are not used by the search engine.

LENGTH (5 bits): This field is interpreted in one of two ways:

1. If IC is set, and NIL is not set, then this field is interpreted as the length of an IDP (as explained above).
2. If IC is not set, and NIL is not set, then this field is interpreted as the length of a constant string stored at the node. The constant string will be matched against the digits of the search key until there is a mismatch or until either source is exhausted.

String storage spaces

String storage space is provided to store constant strings of variable length at a node. The string is stored as a succession of digits, one digit per byte. (The four most significant bits of each byte are ignored on a write and always read as zero.) The length of the string (number of digits stored) is indicated in the Node Control Word. The maximum number of digits that may be stored is a function of the node address, as shown below:

Transition Nodes:
f800<=Node Address<=ffff—maximum 48 digits.
9000<=Node Address<=f7ff—maximum 16 digits.
8000<=Node Address<=8fff—no storage allowed.
Terminal Nodes:
7800<=Node Address<=7fff—maximum 48 digits.
1000<=Node Address<=77ff—maximum 16 digits.
0000<=Node Address<=0fff—no storage allowed.
("x<=y" means x is less than or equal to y)

When the search engine encounters a node at which a path digit string is stored, the string will be compared against the remaining search address digits until either source of digits is exhausted or until there is a mismatch.

Next Node Pointers

Eighteen "next node" pointers are provided for all 32K Transition Nodes. (Pointer compression has not been implemented.) The first 32K nodes are "Terminal Nodes" and no transitions can be made from them.

A next-node pointer will be selected by the search engine if a string match has been successfully completed (where relevant), if the node is not a terminal or NIL node, and if there are search address digits remaining. The selection is made according to the following rules (refer to Theory of Operation, above):

1. If an IDI length has been loaded into the IDIL register 250 and that length has been decremented to exactly zero (or, if not, and the current node is loading a total IDP length of 2 into IDIL)—i.e. if the search engine believes that the next search key digit to be processed is the first digit of the DSP—then the DSP Pointer will be selected. The DSP Pointer can be selected at most once during a search operation. Selection of the DSP Pointer does not consume the current search key digit—it will be used in the next machine cycle. 2. Otherwise, if there are exactly fourteen search key digits remaining and the L1 bit is set in the Node Control Word at this node, then the Level-1 Pointer will be selected. The Level-1 Pointer can be selected at most once during a search operation. Selection of the Level-1 Transition Pointer does not consume the current search key digit—it will be used in the next machine cycle.

NOTE: If both (1) and (2) apply, the conditions for (2) will be re-examined after (1) has been effected.

3. Otherwise, the next digit of the search key will be used to select one of the first sixteen next-node pointers. For example, if the digit is zero, then the pointer at address 40 will be used. (Pointer address offset is 40, refer to FIG. 9).

Search Address Storage Area 32 bytes of storage space are provided at each of nodes 8000 through 8007. Of these 32 bytes, the first 24 bytes are used for loading a new search address; the result of the search is written by the search engine into the last eight bytes. Up to eight search contexts are supported—but note that a new search should not be initiated until the current one is complete (because this will abort the current search). When a search is initiated, the node used to load the search address will be the root node used by the search engine. The format of the search address must be as follows:

First byte (address 80/a0): length of search address.
Subsequent bytes: search address, length as defined in first byte.

The length information written to the first byte is interpreted in one of two ways: If the byte is written to address 80, it is interpreted as an octet length, i.e. the number of digits provided is twice the value of the length byte; if the length byte is written to address a0, it is interpreted as a semi-octet length, explicitly indicating the number of digits in the search key. Address space a0-bf is otherwise an alias of address space 80-9f. (NOTE: the current ARE implementation regards a semi-octet length in excess of 40 (decimal) or equal to zero as an error).

More digits can be written to the search key area than are implied by the length octet; at most 32 octets in total should be written or else the thirty-third octet will either reinitialize the search or cause a bus error. If more than 24 octets are supplied, the excess octets will be overwritten with the search result at the time that it becomes available. If fewer octets are supplied than the length field indicates, then the search engine will wait indefinitely for them to be supplied unless it terminates the search prematurely.

Search Result Information

The result of a search is available at addresses 98-9f (equally b8-bf) at the same node in which the search key was loaded (i.e. one of nodes 8000 through 8007). The format of the result is as follows:

| Offset | Interpretation |
|---|---|
| 98 or b8 | Summary status byte. |
| 99 or b9 | Remaining semi-octet length of search address at termination of search. [byte] |
| 9a-9b or ba-bb | Most recent node encountered with SR bit set [unsigned word]. |
| 9c or bc | Remaining semi-octet length of IDI at termination of search [signed byte]. |
| 9d or bd | Value of string digit counter at termination of search. [byte] |
| 9e-9f or be-bf | Node most recently encountered during search (except if this is a NIL node). [unsigned word] |

Refer below to appendix B for detailed information on interpreting the result information.

Control and Status Registers

Parity Control and Status register 0 Address 080000c0

| format: | PES | PEP | EPS | EPP | 0 | 0 | 0 | 0 |
|---|---|---|---|---|---|---|---|---|
| reset state: | 0 | 0 | 0 | 0 | 0 | 0 | 0 | 0 |

Status register 0 provides parity control and status for CPU accesses to the database memories that are implemented with DRAMs.

PES: Set whenever parity error is detected on CPU read of string storage memory. Reset by CPU overwriting with a one.

PEP: Set whenever parity error is detected on CPU read of next-node pointers. Reset by CPU overwriting with a one.

EPS: Read/write by CPU. When zero, use odd parity (generate and check) on string storage memory; when set to one, use even parity.

EPP: Read/write by CPU. When zero, use odd parity (generate and check) on next-node pointer memory; when set to one, use even parity.

| Control Register 1 - Address 080000c1 | | | | | | | |
|---|---|---|---|---|---|---|---|
| format: | SM | NSAP | IL1 | IDSP | SDK | d2 | d1 | d0 |
| reset state: | 0 | 0 | 0 | 0 | 0 | 0 | 0 | 0 |

There is one control register for the entire ARE. The bits are defined below:

SM (Search Mode): When SM=0 (="maintenance mode"), Search Mode is inhibited and search result information is invalid; the search engine is reset. This mode must be selected before the CPU can access any resource below address 7f. When SM=1, Search Mode is enabled. This mode must be selected before a search key is loaded, and must be maintained until the result has been read. In this mode, all resources below address 7f are inaccessible.

NSAP (NSAP mode): This bit influences only the setting of the success/failure bit in the result summary octet at the end of a search, as detailed later in the disclosure.

IL1 (Inhibit Level-1 transitions): If this bit is set, then during any search a Level-1 transition will not be made.

IDSP (Inhibit DSP transition): If this bit is set, then during any search, a DSP transition will not be made.

SDK (Stall DSACK): If this bit is set, then reading the search result information (defined under Search Result Information above) will result in a possibility extended bus cycle that will be stalled until the result is available; this eliminates the need to check if the result is available. This is applicable to every context, but only in Search Mode.

d2,d1,d0—not used by the ARE.

| Search Status Register 2 - address 080000c2 (read only) | | | | | | | | |
|---|---|---|---|---|---|---|---|---|
| format: | BCNT | RT2 | RT1 | RT0 | 0 | 0 | 0 | 0 |
| reset state: | u | u | u | u | 0 | 0 | 0 | 0 |

The four status bits available from this register are provided primarily for diagnostic purposes. The bits are valid only when the search engine is either HALTed or BUSY (as defined in status register 3).

BCNT: This bit is set when the search engine is assuming that the first byte of the search address is a octet-wise length count; if BCNT is cleared, then a semi-octet (digit) count is assumed.

RT2.0: These three bits are equal to the three least significant bits of the root address that the search engine is using for the purpose of reading the search argument.

| Search Status Register 3 - address 080000c3 (read only) | | | | | | | | |
|---|---|---|---|---|---|---|---|---|
| format: | BUSY | HALT | f5 | f4 | f3 | f2 | f1 | f0 |
| reset state: | 0 | 0 | 0 | 0 | 0 | 0 | 0 | 0 |

This status register provides search engine status for application and diagnostic use.

BUSY: This bit is set when the search engine is processing nodes or is loading the result.

HALT: This bit: is set when the search engine has stopped processing nodes.

The above two bits should be decoded as a pair.

| BUSY | HALT | Interpretation |
|---|---|---|
| 0 | 0 | Search engine is reset. |
| 1 | 0 | Search engine is searching. |
| 1 | 1 | Result is being loaded (short transitional state). |
| 0 | 1 | Result is available for reading. | f5 . . . f0: These bits are set by writing components of the search key into the register file, and are used by the search engine as an indication that valid data is present.

All bits of register 3 are reset whenever the machine is in maintenance mode (bit 7 of control register 1 is zero). Bits f5 through f1 are reset whenever the CPU writes to the last byte of the first longword of the search key; at the same time, bit f0 is set (if search mode is enabled). Bit f1 is set, in search mode, when the CPU writes to the last byte of the second longword of the search key; and bits f2 through f5 are similarly set on writing the last byte of the third through sixth longwords.

| ARE Status Register 4 - address 080000c4 (read only) | | | | | | | | |
|---|---|---|---|---|---|---|---|---|
| format: | s7 | s6 | s5 | s4 | s3 | s2 | s1 | s0 |
| reset state | — | — | — | — | — | — | — | — |

This status register allows the CPU to read the positions of eight switches in the on-board switchpack.

Decoding the Search Result from the ARE

The result of a search is available at addresses 98-9f (equally b8-bf) at the same node in which the search key was loaded; i.e., one of nodes 8000 through 8007. If the control bit "SDK" is set (bit 3 in control register 1), then the result may be read at any time after loading the search key—the CPU will be stalled by hardware until valid data can be returned. If the "SDK" bit is not set, then the CPU must poll status register 3 to determine when search result status is valid.

The format of the result is as follows; minimum delay will be incurred if the result is read as two longwords.

| address (* = 0..7) | field contents | | |
|---|---|---|---|
| 08800*98 | <--summary-> | <-Rem. Len.-> | <-Result So Far-> |
| 08800*9C | <-Rem. IDI-> | <-Str. Cnt.-> | <---Got So Far--> |
| Field | Size | Interpretation | |
| Summary | byte | Summary status byte (see below). | |
| Rem. Len. | byte | Number of remaining search key digits not processed by the search engine | |
| Result So Far | word | Most recent node in TRIE traversed by search engine that had "save result" bit set. | |
| Rem. IDI. | byte | Number of remaining IDI digits in search key not processed by search engine (value may be negative). | |
| Str.Cnt | byte | String Counter value — provides information in cases of string mismatch search termination. | |
| Got So Far | word | Node being processed by search engine at time.of termination (except if this is a NIL Node) | |

Summary Status Byte.

The summary status byte is provided so that the host CPU can rapidly determine whether a search was successful or not; and if not, the reason for the search failure.

The encoding depends upon whether the database is deemed by the search engine to be corrupted or not; and is further influenced by the "NSAP mode" bit in Control Register 1.

The two cases are dealt with separately below:

Case 1: database corrupted.

For a corrupted database, the encoding of the output will be:

| 1 | 1 | 0 | ISC | PEP | PES | L1ND | L1DE |
|---|---|---|---|---|---|---|---| where

ISC=Illegal String Count reached (the CPU indicated that there were more string digits present than the maximum allowed at a node)

PEP=Parity Error on Pointer memory

PES=Parity Error on String memory

L1ND=Level-1 transition made but no DSP transition made (NSAP mode only)

L1LDE=Level-1 transition made and source digits exhausted (NSAP mode only)

The setting of bits ISC, PEP and PES is mutually exclusive.

If ISC is set, then the search engine attempted to run a string comparison cycle with a digit pointer that exceeded the maximum string length allowed at a node. The "Got So Far" field contains the node at which the string is stored; the "String Count" field contains the string digit pointer which is too large.

If PEP is set, then a transition was made from a node through one of the sixteen "next node" pointers. The address indicated for the next node contained a parity error. The "Got So Far" field contains the node at which the corrupted "next node" pointer is stored. The "Remaining Length" field indicates how many digits of the search key remain to be processed by the search engine; the first of these remaining digits is the one immediately following the digit that was used to select the corrupted "next node" pointer.

If PES is set, then a string comparison cycle was run but the stored string digit contained a parity error. The "Got So Far" field contains the node at which the corrupted string is stored. The "String Count" field points to the digit after the one at which a parity error was detected.

The setting of the L1ND and L1DE bits is independent of the ISC, PEP and PES bits. At the termination of the search, for whatever reason, the L1ND bit will be set if NSAP mode is selected, and a Level-1 transition has been made but not a DSP transition. The L1DE bit will be similarly set if a Level-1 transition has been made and there are no remaining search key digits—the search engine expects that there will normally be at least two remaining digits at the termination of an NSAP search if a Level-1 transition has been made (these two digits are the SEL field).

Case 2: database not corrupted.

If the database is not considered to be corrupted, then the encoding of the bits in the Summary Status Byte will be:

| F | 0 | RL | NIL | SM | DE | L1 | DSP |
| --- | --- | --- | --- | --- | --- | --- | --- | where

F=search Failure (0=success). This bit is influenced by the NSAP Mode bit.

RL="Result So Far" field is valid.

NIL=NIL Node reached

SM=String Mismatch occurred

DE=Source Digits Exhausted

L1=Level-1 transition made

DSP=DSP transition made

The F bit is 0 when the search is successful. A successful search is defined as one in which the database is not corrupted, the supplied length is in the range 1 to 40 semi-octets, and, in addition, in NSAP mode either a) a Level-1 transition has not been made and the Result-So-Far register has been loaded at least once; then the encoding of the summary status byte will be: 001X XX0X—or b) a Level-1 transition has been made, there has been no string-mismatch, a terminal node has been reached at which the SR bit is set, and (implicitly) a DSP transition has been made and not all of the search key digits have been used. The encoding of the summary status byte in this case will be: 0010 0011.

In non-NSAP mode a successful search is where the database is not corrupted, the search address length is in the prescribed length, all of the search address digits have been used, there has been no string mismatch (and the search address digits did not become exhausted during a string match), and the final node reached (which is not a NIL Node) has the SR bit set. The final node may or may not be a Terminal Node—if it is a Terminal Node, then the "DE" bit will be zero (even though the digits are exhausted). The encoding of the Summary Status Byte will be: 0010 0XXX The RL bit is set after the "Result So Far" field is loaded with a node address during a search. This bit indicates that the "Result So Far" field contains valid data; if RL equals zero, then the value of the "Result So Far" field is undefined (in preferred embodiments, it will contain the root node).

The setting of the L1 bit depends upon whether the control bit "IL1" in control register 1 is set or not. If it is not set, then Level-1 transitions are enabled, and the L1 status bit will be set only if a Level-1 transition was made during the search. Otherwise, if the "IL1" bit is set, then Level-1 transitions are inhibited; in this case, the L1 status will be set if, at any time during the search, a transition was made from a node (not a DSP transition) at which the node control bit "Enable Level-1 Transition" was set.

The DSP bit will be set if and only if a DSP transition was made during the search. If the control bit "IDSP" is set in control register 1, then DSP transitions are inhibited and the DSP (transition made) status bit will always be zero.

The NIL, SM, DE bits encode the reason why the search engine stopped in the case where the database is not corrupted. Each case is dealt with in detail below; note that, as explained above, the "Result So Far" field is only valid if the RL bit is set.

a) NIL, SM, DE=000: This encoding means that a terminal node was reached by the search engine. The "Got So Far" field contains the terminal node. The "Result So Far" field contains the node most recently traversed that had the "SRSF" node control bit set; if "SRSF" is set at the terminal node, then "Result So Far" will be equal to "Got So Far". The "Remaining Length" field indicates how many search key digits were not used by the search engine; the value may be zero, indicating that the very last digit was responsible for taking the search engine to the terminal node.

b) NIL, SM, DE=001: This encoding means that the search engine stopped because it ran out of search key digits; it would otherwise have made a transition from the node at which it came to rest. The "Got So Far" field contains the node reached by the search engine when the digits ran out. This node is neither NIL nor a terminal node. If there is a string stored at the node, then it will have been successfully matched. If the "SR" bit is set at this node, then the "Result So Far" will be equal to "Got So Far"; otherwise, it will contain the node most recently traversed that had the "SR" bit set. Note that a Level-1 or a DSP transition can be made from node even when the search address digits are exhausted; thus, neither a DSP nor a Level-1 transition can be made from the final node reached as indicated by "Got So Far".

c) NIL, SM, DE=010: This encoding means that the search engine stopped because it detected a mismatch between a constant string digit and the next digit of the search key. The "Got So Far" field contains the node at which the constant string is stored. The "String Count" field points to the string digit after the one which mismatched. The "Remaining Length" field indicates how many search key digits have not been processed by the search engine; the first of these remaining digits immediately follows the digit that was mismatched against the constant string digit.

The "Result So Far" field contains the node most recently visited (before the one at which the search terminated) that had the "SRSF" bit set.

d) NIL, SM, DE=011: This encoding means that the search engine stopped because it could not perform the string digit comparison cycle that it was tasked with. This occurred because either: (i) the digits in the search argument became exhausted, or (ii) specifically, the IDP digits of the search argument became exhausted while comparing against a path digit string storing only IDP digits. The "Got So Far" field contains the node at which the string is stored. The "String Count" field points to the string digit that would have been compared against (i) the next search key digit, or (ii) the next IDP digit, had there been one.

The "Result So Far" field contains the node most recently visited (before the one at which the search terminated) that had the "SR" bit set.

e) NIL, SM, DE=100: This encoding means that the search engine reached a NIL node. The "Got So Far" field contains the node most recently visited before the NIL Node; similarly, the "Result So Far" field contains the node most recently visited (before the NIL Node) at which the "SR" bit was set.

The transition to the NIL node was made by using a search key digit to leave the node indicated in the "Got So Far" Field. This digit is the last that was used by the search engine; it is not included in the "Remaining Length" or "Remaining IDI length" counts.

f) NIL, SM, DE=110:This encoding also means that the search engine reached a NIL node. In this case, the transition was made by using either a DSP or the Level-1 pointer to leave the node indicated in the "Got So Far" field. In the usual case, the Level-1 pointer will not point to a NIL Node and so it can be assumed that a DSP transition was made to the NIL Node.

Note that, even though the DSP transition was to a NIL Node, the status bit "DSP Transition Made" will be set; the value of the "Remaining IDI length" will be zero. The value of the "Remaining length" field will be equal to the entire DSP length of the supplied search key.

g) NIL, SM, DE=111: This encoding means that an illegal search key length was supplied to the search engine; i.e., zero or more than forty digits. In this case, the search engine makes no progress at all on the search key.

Overview of maintenance support required

Maintenance engine 18 inserts a new entry into the database by first presenting it as a search argument to search unit 40. Search unit 40 attempts to locate the search argument in the database; if it fails, it will, at least, report the longest prefix of the search argument that exists in the database. (This longest prefix will not necessarily be associated with "result" in the database).

At most two new nodes will be inserted in the database; one new node will be added to differentiate the new entry from all existing entries—this node will be inserted at the point where the search unit located the longest prefix of the new entry; one additional new node will be added, and will contain a path compression string equal to all of the remaining digits of the new entry beyond the prefix match with the database.

The differentiation node only needs to be added where the new entry was being compared against a path compression string the database, and a mismatch occured during one of the comparisons. In this case, the path compression string must be broken in two at the point of mismatch. The part which compared successfully against the new entry is stored in a new node (the differentiation node), which will have two non-nil pointers. One pointer points to the node which originally held the path compression string (the original path compression string is replaced by the part of it which mismatched against the new entry). The second pointer points to the new node which holds the path compression string (if any) of the remaining digits of the new entry.

The inverse process is used for deletion.

Memory Savings of Pointer and Path Compression

The analysis presented here shows roughly how much physical memory can be saved by applying the techniques of path compression and pointer compression to a TRIE based database. For the analysis, it will be assumed that there are up to sixteen pointers at a node, corresponding to four-bit characters (semi-octets) of the search argument processed at each node. For different sizes of characters, the analysis should be performed with a parameter substituted for the fixed size of sixteen pointers assumed here. Additionally, the idiosyncrasies of ISO and DECnet Phase-V addresses are not considered.

The analysis will consider the memory requirements for storing a worst-case database with a given number of entries. Firstly, path compression will be considered, followed by the application of pointer compression in addition to path compression.

Consider a TRIE based database that is required to store up to N entries. Let the entries be of variable length up to a maximum of L semi-octets. Each node in the TRIE will contain sixteen pointers. In the worst case, a maximal number of nodes is required to hold these N entries.

The worst case will occur when all distinctions between the entries are made at nodes as close to the root as possible. In the way, every entry will have associated with it a large chain of nodes each using only one non-nil pointer pointing to the next link in the chain. The depth of TRIE required to specify all N entries will be $Log_{16}N$. The total number of nodes used up to this level will be $(N-1)/15$.

Nodes that are used within the long chains make up the bulk of the total number of nodes required. There will be N chains. If every entry in the database is L semi-octets long, then every chain will be of length $(L-log_{16}N)$, the end of each chain pointing to a terminal node for which no storage requirement will be assumed.

Thus, the total number of nodes required will be:

$$(N-1)/15+(L-log_{16}N)*N \tag{1}$$

each of size 16 pointers. To a good first approximation, this can be simplified to $$L*N \text{ nodes.} \tag{2}$$

Now consider that path compression is implemented. Long chains of nodes will now be collapsed into terminal nodes or into nodes with at least two pointers. The greatest amount of memory will be required when there are as many (non-terminal) nodes as possible. This is the case when every non-terminal node has exactly two pointers (for example, a binary trie). The total number of non-terminal nodes will be N-1. Terminal nodes will require no storage for pointer; thus the memory requirement for pointers will be (with sixteen pointers per node)

$$(N-1)*16 \text{ pointers} \tag{3}$$

There is also some memory requirement for the path compression strings. The distribution of the strings amongst the nodes can vary widely; but if there are N entries in the database each of length L semi-octets, the total storage requirement cannot exceed (N*L) semi-octets. If a pointer is equated to four semi-octets, then adding the requirement of equation (3) gives a total memory requirement of $$(N-1)*64+(N*L)=N*(64+L) \text{ semi-octets} \quad (4)$$

to a good approximation. When compared with the storage requirement for the same sized database without path compression, equation (2), the ratio of (2) to (4) is $$(64*L)/(64+L) \quad (5)$$

which is bounded by the limits of 1 (for small L) and 64 (for large L). In the case of ISO 8348/AD2 network addresses, for which L=40, the reduction factor is 24.6, representing a very significant savings in physical memory.

Note that an implementation may want to allocate enough memory for a maximum length path compression string at every node, in order to make memory management easier. In this case, approximately twice as much memory is required to store the path compression strings, and equation (5) is modified to $$(32*L)/(32+L) \quad (6)$$

which has an upper bound of 32, and the reduction factor for the case of ISO addresses is 17.8, still very significant.

Next consider adding pointer compression to a path compressed TRIE. The worst case storage requirement for a path compressed TRIE without pointer compression is given by equation (4). When pointer compression is introduced, the worst case occurs when as many actual (i.e. non-nil) pointers as possible are used. Since each non-nil pointer points to a node, this occurs when as many nodes as possible are used. Thus the worst case occurs for the same binary trie structure used in the non pointer compressed case above. The size of each non-terminal node will be two pointers plus a bit mask. The bit mask is sixteen bits wide, essentially the same size as a pointer. Thus the storage requirement for the path compressed and pointer compressed TRIE is, in the worst case, $$(N-1)*3 \text{ pointers}+(N*L) \text{ semi-octets}= \quad (7)$$

$$N*(12+L) \text{ semi-octets} \quad (8)$$

to a good approximation. By comparison with the storage requirement for path compression alone, equation (4), there is a further reduction in memory requirement by a factor of $$(64+L)/(12+L) \quad (9)$$

having a value between 1 and 5. For the case of ISO addresses, where L=40, the reduction factor is 2.

The overall reduction factor for a path compressed and pointer compressed database, compared to a database with no compression, is the product of equations (5) and (9). This is $$(64+L)/(12+L) \quad (10)$$

which is bounded by the limits of 5 for small L and 64 for large L. For the case of ISO addresses, the overall reduction factor is 49.

We claim:

1. A method of conducting a search of reduced length through a stored database containing nodes and pointers leading from one of said nodes to another of said nodes in response to a search argument, said search argument defining a search path following pointers through said nodes, by eliminating an eliminated node that would otherwise occur between an immediately previous and an immediately following node in said search path, comprising the machine-implemented steps of:
   storing information describing conditions under which, had said eliminated node been present, the search would have proceeded to said following node,
   following said search path through said nodes,
   when said search reaches said previous node,
   determining whether said search argument meets the conditions of said stored information, and
   causing said search to effectively progress from said previous node directly to said following node if the comparison indicates that, had said eliminated node been present, said search would have proceeded to said following node.

2. The method of claim 1, wherein
   at least some of said nodes identify a result value,
   said eliminated node would have provided a result value, and said following node provides a result value of said search, and
   the result value that would have been provided by said eliminated node is equal to the result value that is provided by said following node.

3. The method of claim 1, wherein said information is stored in said following node.

4. The method of claim 3, wherein
   said search argument comprises a series of search segments, each segment of said argument corresponding to a node along said search path,
   at least one value of a segment corresponding to a given node being related to a pointer leading from said given node to another node, and some other values of said segment being related to a terminating mode of said search.

5. The method of claim 4, wherein
   said stored information is a given value of a search segment corresponding to said eliminated node,
   said given value being a value that would have been related to a pointer leading from said eliminated node to said following node.

6. The method of claim further comprising
   associating one or more sets of indicators respectively with one or more nodes, each indicator in a given set associated with a given node indicating a value of a segment of said search argument corresponding to said given node that is related to said terminating mode, and wherein
   following said search path comprises processing successive search segments of said search argument, processing of a given search segment having a given value including
   retrieving the set of indicators associated with a node along said search path that is associated with said given search segment, and determining whether an indicator in said set indicates that said given value is related to said terminating mode, and
   proceeding to said terminating mode if an indicator indicates that said given value relates to said terminating mode, otherwise retrieving a pointer leading from said given node that is related to said given value, and following said pointer to a subsequent node along said search path.

7. The method of claim 6 wherein said terminating mode of said search comprises terminating said search.

8. The method of claim 7 wherein said search argument comprises a system address in a network, and said result values comprise routing information for transmitting packets through said network to a device designed by said address.

9. A method of conducting a search in response to a search argument, comprising the machine-implemented steps of:

storing, for a first mode of said search, a database of nodes forming search paths, at least some of said nodes including one or more pointers pointing to other said nodes to form said paths, parsing said search argument into a series of search segments having values, each respective segment associated with a respective node along a said search path, each value of a segment identifying either: a pointer in a node associated with said segment that points to a subsequent node along said search path; or a terminating mode of said search, associating groups of indicators with one or more nodes, each indicator in a group associated with a given node indicating whether a value of a segment of said search argument associated with said given node identifies said terminating mode, and following said search path by processing successive search segments of said search argument, processing of a given search segment having a given value including retrieving the set of indicators associated with a given node along said search path associated with said given search segment, and determining whether an indicator of said set indicates that said given value is associated with said terminating mode, and proceeding to said terminating mode if an indicator indicates that said given value is associated with said terminating mode, otherwise retrieving from said given node a pointer identified by said given value and proceeding to a subsequent node along said search path pointed to by said pointer.

10. The method of claim 9, wherein said pointer are stored in contiguous memory space in said nodes, and no pointer are stored for values of segments of said search argument that relate to said terminating mode of said search, such that, in a given node associated with a given segment of said search argument, locations of pointers stored in said given node are determined by how many values of said given segment do not relate to said second mode, further comprising if a value of a segment being processed does not correspond to said terminating mode, examining said indicators and said value to locate a pointer that corresponds to said value, retrieving said pointer and continuing said search to a subsequent node pointed to by said pointer.

11. The method of claim 9, wherein each said indicator is a bit in a sequence of bits associated respectively with a plurality of said segment values.

12. The method of claim 9, wherein said terminating mode of said search comprises terminating said search.

13. The method of claim 9 wherein said search argument comprises a system address in a network, and said search terminates with a value comprising routing information for transmitting packets through said network to the device designated by said address.

14. Apparatus for conducting a search of reduced length through a stored database containing nodes and pointers leading from one of said nodes to another of said nodes in response to a search argument, said search argument defining a search path following pointers through said nodes, by eliminating an eliminated node that would otherwise occur between an immediately previous and an immediately following node in said search path, comprising a memory storing information describing conditions under which, had said eliminated node been present, the search would have proceeded to said following node, a controller for following said search path through said directed graph of nodes, a comparator for determining whether said search argument meets the conditions of said stored information when said controller reaches said previous node, wherein said controller causes said search to effectively progress from said previous node directly to said following node if said comparator indicates that, had said eliminated node been present, said search would have proceeded to said following node.

15. The apparatus of claim 14, wherein at least some nodes identify a result value, said eliminated nodes would have provided a result value, and said following node provides a result value for said search, and the result value that would have been provided by said eliminated node is the result value that is provided said following node.

16. Apparatus for conducting a search in response to a search argument, comprising a memory storing, for a first mode of said search, nodes forming search paths, at least some of said nodes including one or more pointers pointing to other said nodes to form said paths, a fetch unit for parsing said search argument into a series of search segments having values, each respective segment associated with a respective node along a said search path, each value of a segment identifying either: a pointer in a node associated with said segment that points to a subsequent node along said search path; or a terminating mode of said search, a memory storing groups of indicators associated with one or more nodes, each indicator in a group associated with a given node indicating whether a value of a segment of said search argument associated with said given node identifies said terminating mode, and a controller for following said search path by processing successive search segments of said search argument, processing of a given search segment having a given value including retrieving the set of indicators associated with a given node along said search path associated with said given search segment, and determining whether an indicator of said set indicates that said given value is associated with said terminating mode, and proceeding to said terminating mode if an indicator indicates that said given value associated with said terminating mode is set, otherwise retrieving from said given node a pointer identified by said given value and proceeding to a subsequent node along said search path pointed to by said pointer.

17. The apparatus of claim 16, wherein said pointers are stored in contiguous space in said memory, and no pointers are stored for values of segments of said search argument that relate to said terminating mode of said search, such that, for a given node associated with a given segment of said search argument, locations of pointers stored in said memory are determined by how many values of said given segment do not relate to said second mode, and if indicator determines that a value of a segment being processed does not correspond to said terminating mode, said controller examines said indicators and said value to locate a pointer that corresponds to said value, and continues said search to a subsequent node.

18. The apparatus of claim 17, wherein each said indicator is a bit in a sequence of bits associated respectively with a plurality of said segment values.

\* \* \* \* \*